(12) United States Patent
Minakawa et al.

(10) Patent No.: US 8,391,512 B2
(45) Date of Patent: Mar. 5, 2013

(54) BROADCAST WAVE RECEIVING SYSTEM

(75) Inventors: Atsushi Minakawa, Neyagawa (JP);
Sadatoshi Hisamoto, Neyagawa (JP);
Tetsuya Toyama, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 359 days.

(21) Appl. No.: 12/774,071

(22) Filed: May 5, 2010

(65) Prior Publication Data
US 2011/0075721 A1 Mar. 31, 2011

(30) Foreign Application Priority Data

Sep. 25, 2009 (JP) ................................ 2009-220667
Sep. 25, 2009 (JP) ................................ 2009-220668

(51) Int. Cl.
*H03G 5/00* (2006.01)
*G08B 1/08* (2006.01)
*H04B 15/00* (2006.01)
(52) U.S. Cl. ........................ 381/98; 340/539.1; 455/62
(58) Field of Classification Search ............... 381/2–16, 381/94.5, 98–103, 123; 455/3.02, 130; 375/328, 375/238, 239
See application file for complete search history.

(56) References Cited

U.S. PATENT DOCUMENTS

| 5,650,769 | A * | 7/1997 | Campana, Jr. ............. 340/573.4 |
| 7,456,668 | B2 | 11/2008 | Nakanishi et al. |
| 2002/0142724 | A1* | 10/2002 | Nakano ........................... 455/62 |
| 2003/0014755 | A1* | 1/2003 | Williams ........................ 725/62 |
| 2009/0066377 | A1 | 3/2009 | Nakanishi et al. |
| 2009/0140786 | A1 | 6/2009 | Nakanishi et al. |
| 2010/0014574 | A1* | 1/2010 | Homma et al. .............. 375/238 |

FOREIGN PATENT DOCUMENTS

| JP | 05-315980 | 11/1993 |
| JP | 2002-290261 | 10/2002 |
| JP | 2003-218715 | 7/2003 |
| JP | 2004-507967 | 3/2004 |
| JP | 2005-064810 | 3/2005 |
| JP | 2008-311838 | 12/2008 |
| JP | 2009-065613 | 3/2009 |
| JP | 2009-141408 | 6/2009 |
| WO | 02/19551 A2 | 3/2002 |

* cited by examiner

*Primary Examiner* — Fan Tsang
*Assistant Examiner* — Eugene Zhao
(74) *Attorney, Agent, or Firm* — Renner, Otto, Boisselle & Sklar, LLP

(57) ABSTRACT

A controlling unit includes: a memory unit that stores information in which the multiple clock frequencies that satisfy conditions for predetermined reception interferences to a part of multiple carrier frequencies included in a band frequency of the broadcast wave are previously set so that not all clock frequencies satisfy the conditions for the reception interferences to the same carrier frequencies, the information indicating a relation between each clock frequency and the carrier frequency that includes the reception interference; a reception frequency setting unit that sets the carrier frequency to be received to the broadcast wave receiving unit; a clock frequency determining unit that refers to the information stored in the memory unit and determines a clock frequency that does not include a reception interference to the carrier frequency that is set by the reception frequency setting unit, the determined clock frequency being out of the multiple clock frequencies; and a clock frequency setting unit that sets the clock frequency determined by the clock frequency determining unit to the reference clock generating unit, so that the reference clock generating unit generates a reference clock having the determined clock frequency.

2 Claims, 12 Drawing Sheets

FIG. 6 fmc1 = 189 kHz, fmc2 = 210 kHz

| f0 | fmc1 | fmc2 |
|---|---|---|
| 522 | | |
| 531 | | |
| 540 | | |
| 549 | | |
| 558 | | |
| 567 | x | |
| 576 | | |
| 585 | | |
| 594 | | |
| 603 | | |
| 612 | x | |
| 621 | | |
| 630 | | x |
| 639 | | |
| 648 | | |
| 657 | | |
| 666 | | |
| 675 | | |
| 684 | | |
| 693 | | |
| 702 | x | |
| 711 | x | |
| 720 | x | |
| 729 | x | |
| 738 | x | |
| 747 | | |
| 756 | | |
| 765 | | |
| 774 | | |
| 783 | | x |
| 792 | | |
| 801 | | |
| 810 | | |

| f0 | fmc1 | fmc2 |
|---|---|---|
| 819 | | x |
| 828 | | x |
| 837 | | x |
| 846 | | x |
| 855 | | x |
| 864 | | x |
| 873 | | |
| 882 | | |
| 891 | | |
| 900 | | |
| 909 | | |
| 918 | | |
| 927 | | |
| 936 | | |
| 945 | x | |
| 954 | | |
| 963 | | |
| 972 | | |
| 981 | | |
| 990 | x | |
| 999 | | |
| 1008 | | |
| 1017 | | |
| 1026 | | |
| 1035 | | |
| 1044 | | |
| 1053 | | x |
| 1062 | | |
| 1071 | | |
| 1080 | | |
| 1089 | | |
| 1098 | | |
| 1107 | x | |

| f0 | fmc1 | fmc2 |
|---|---|---|
| 1116 | x | |
| 1125 | x | |
| 1134 | x | |
| 1143 | x | |
| 1152 | x | |
| 1161 | | |
| 1170 | | |
| 1179 | | |
| 1188 | | |
| 1197 | | x |
| 1206 | | x |
| 1215 | | |
| 1224 | | |
| 1233 | | x |
| 1242 | | x |
| 1251 | | x |
| 1260 | | x |
| 1269 | | x |
| 1278 | | x |
| 1287 | | |
| 1296 | | |
| 1305 | | |
| 1314 | | |
| 1323 | x | |
| 1332 | | |
| 1341 | | |
| 1350 | | |
| 1359 | | |
| 1368 | x | |
| 1377 | | |
| 1386 | | |
| 1395 | | |
| 1404 | | |

| f0 | fmc1 | fmc2 |
|---|---|---|
| 1413 | | |
| 1422 | | |
| 1431 | | |
| 1440 | | |
| 1449 | | |
| 1458 | | x |
| 1467 | | x |
| 1476 | | |
| 1485 | x | |
| 1494 | x | |
| 1503 | x | |
| 1512 | x | |
| 1521 | x | |
| 1530 | x | |
| 1539 | | |
| 1548 | | |
| 1557 | | |
| 1566 | | |
| 1575 | | |
| 1584 | | |
| 1593 | | |
| 1602 | | |
| 1611 | | |
| 1620 | | x |
| 1629 | | |

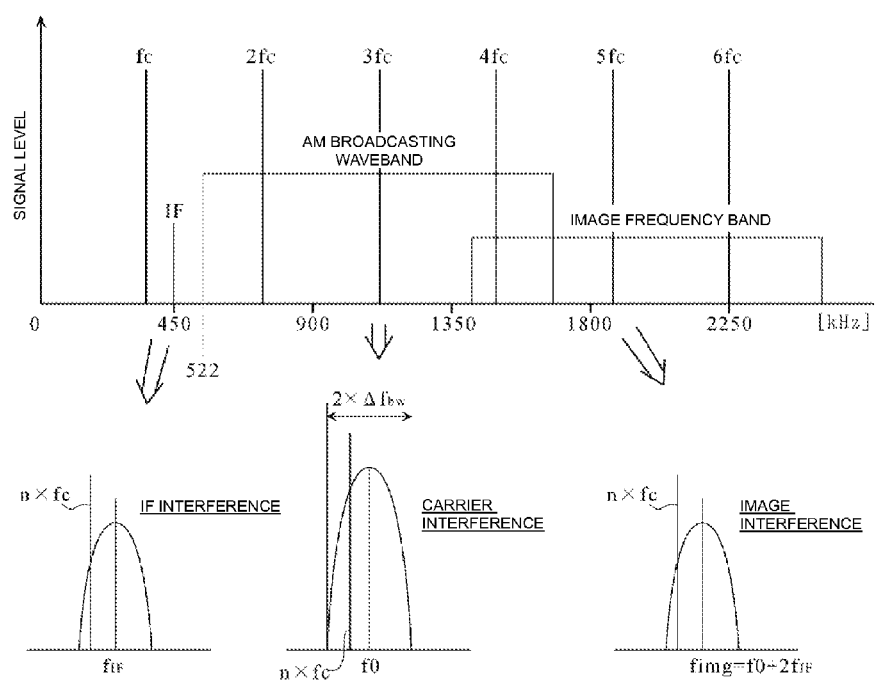

FIG. 10 fmc1=168kHz, fmc2=179kHz, fmc3=192kHz, fmc4=270kHz

| f0 | fmc1 | fmc2 | fmc3 | fmc4 |
|---|---|---|---|---|
| 522 | x | x | | |
| 531 | | x | | |
| 540 | | x | | |
| 549 | | x | | x |
| 558 | | | | |
| 567 | | | x | |
| 576 | | | x | |
| 585 | | | x | |
| 594 | | | | |
| 603 | | | | |
| 612 | x | | x | x |
| 621 | | | | x |
| 630 | x | x | | |
| 639 | x | x | | |
| 648 | x | x | | |
| 657 | x | x | | |
| 666 | x | x | x | |
| 675 | x | x | x | |
| 684 | x | x | x | |
| 693 | x | x | x | |
| 702 | x | x | x | |
| 711 | x | x | x | x |
| 720 | | x | | |
| 729 | | x | x | |
| 738 | | x | x | |
| 747 | | x | x | x |
| 756 | | x | x | |
| 765 | | x | x | |
| 774 | | | | |
| 783 | x | | x | |
| 792 | x | | x | x |
| 801 | | | x | x |
| 810 | | | x | x |

| f0 | fmc1 | fmc2 | fmc3 | fmc4 |
|---|---|---|---|---|
| 819 | x | | | x |
| 828 | x | | | x |
| 837 | x | | x | x |
| 846 | | | | x |
| 855 | | | | x |
| 864 | | | x | x |
| 873 | | | x | |
| 882 | | | | |
| 891 | | | x | |
| 900 | | | x | |
| 909 | | x | | |
| 918 | | | | |
| 927 | x | | | |
| 936 | x | | | |
| 945 | x | | x | x |
| 954 | | | x | |
| 963 | x | | x | |
| 972 | x | | | |
| 981 | x | | | |
| 990 | x | | | |
| 999 | x | | | |
| 1008 | x | | x | x |
| 1017 | x | | x | |
| 1026 | x | | x | |
| 1035 | | x | | |
| 1044 | | x | | |
| 1053 | x | x | | |
| 1062 | | x | | |
| 1071 | | x | | |
| 1080 | | x | | |
| 1089 | x | x | | |
| 1098 | x | x | | |
| 1107 | x | x | x | |

| f0 | fmc1 | fmc2 | fmc3 | fmc4 |
|---|---|---|---|---|
| 1116 | x | x | x | |
| 1125 | | | | |
| 1134 | | | x | |
| 1143 | | | x | |
| 1152 | | | x | |
| 1161 | | | x | |
| 1170 | x | | x | x |
| 1179 | x | | x | x |
| 1188 | x | | x | x |
| 1197 | x | | x | x |
| 1206 | | | x | x |
| 1215 | | | | x |
| 1224 | | | | x |
| 1233 | | | | x |
| 1242 | | x | | |
| 1251 | x | x | | |
| 1260 | x | x | | x |
| 1269 | x | x | | x |
| 1278 | | | | x |
| 1287 | x | | | |
| 1296 | x | | | |
| 1305 | x | | | |
| 1314 | x | | | |
| 1323 | x | | | |
| 1332 | x | | x | |
| 1341 | x | | x | |
| 1350 | x | | x | |
| 1359 | x | | | |
| 1368 | x | | | |
| 1377 | x | | | x |
| 1386 | | x | | x |
| 1395 | | x | x | |
| 1404 | | x | x | |

| f0 | fmc1 | fmc2 | fmc3 | fmc4 |
|---|---|---|---|---|
| 1413 | | | | |
| 1422 | | x | | |
| 1431 | | x | | |
| 1440 | x | x | | x |
| 1449 | x | x | | x |
| 1458 | x | x | | x |
| 1467 | | x | | |
| 1476 | | x | | |
| 1485 | | | x | |
| 1494 | | | x | |
| 1503 | x | | x | |
| 1512 | x | | x | |
| 1521 | x | | x | |
| 1530 | | | x | |
| 1539 | | | x | |
| 1548 | | | x | |
| 1557 | | | x | |
| 1566 | | | x | |
| 1575 | | | x | |
| 1584 | | | x | |
| 1593 | | | | |
| 1602 | | | | |
| 1611 | | x | | |
| 1620 | x | x | x | x |
| 1629 | x | x | x | x |

BROADCAST WAVE RECEIVING SYSTEM

BACKGROUND OF THE INVENTION

1. Field of the Invention

The present invention relates to a broadcast wave receiving system provided with a tuner that receives broadcast waves and demodulates sound signals and a switching amplifier that transforms the sound signals output from the tuner into pulse-width modulated signals and amplifies the pulse-width modulated signals.

2. Description of the Related Art

Conventionally, a switching amplifier has been known as an amplifying device for amplifying sound signals that realizes a highly efficient acoustic system. This switching amplifier is a device that transforms the sound signals into pulse-width modulated signals (hereinafter referred to as "PWM signals"), and then amplifies the PWM signals to an output level of a loudspeaker.

As shown in FIG. 12, in general, a switching amplifier 100 is provided with a pulse width modulating unit 101 that transforms an audio signal (analog signal) es that has been inputted from an audio device into a PWM signal, an output unit 102 that amplifies the level of the PWM signal, and a filter unit 103 that transforms the amplified PWM signal back to an analog signal (amplified audio signal) by making the amplified PWM signal to pass through a lowpass filter.

The PWM signals Sout and /Sout that are output from the pulse width modulating unit 101 are signals that have been modulated such that a duty cycle of each pulse in a pulse signal is varied according to changes in the level of the audio signal. Further, the PWM signal /Sout is the signal whose phase is inverted from that of the PWM signal Sout. As a circuit that generates the PWM signals, a method of comparing an audio signal with a triangular wave signal and changing an on-period and an off-period (a duty cycle) of the pulse signal according to a magnitude of the level of the audio signal with respect to the triangular wave signal (so called Triangle Wave Comparison) is typically known.

Further, for example, U.S. Pat. No. 7,456,668 discloses a method of generating a PWM signal with a frequency twice as high as a reference clock by generating the reference clock, transforming the level of the audio signal to time in an on-period and an off-period in each cycle of the reference clock, and generating a pulse having the time as an on-period.

This method of generating the PWM signal, as compared to the Triangle Wave Comparison, is not easily affected by a spike noise superimposed over a sound signal or fluctuation of a power-supply voltage, and is especially suitable as a pulse width modulating circuit of a switching amplifier of an acoustic purpose.

The output unit 102 is configured such that two series circuits of semiconductor switches SW1 and SW2 are equivalently connected between terminals to which a pair of voltages with opposite polarities of +Vd and −Vd (where |Vd| is on the order of a dozen) are inputted from a power supply PS. As the power supply PS that supplies the voltages of ±Vd, a switching power supply is also used in order to realize a highly efficient acoustic system. An on-off operation of the semiconductor switch SW1 is controlled by the PWM signal Sout, and an on-off operation of the semiconductor switch SW2 is controlled by the PWM signal /Sout. Accordingly, the PWM signal obtained by amplifying the amplitude of the PWM signal Sout from that of +Vd to −Vd is output from the output unit 102.

Examples of a source of the audio signal es inputted to the switching amplifier 100 include players for CDs and DVDs and tuners for television and radio. However, in the case where the switching amplifier 100 is mounted to an acoustic device that includes a tuner, and audio signals from the television and the radio demodulated by the tuner are also taken as input signals of the switching amplifier 100, the reception operation by the tuner is often interfered by a frequency for turning on or off the semiconductor switches SW1 and SW2 of the output unit 102 of the switching amplifier 100 and by frequency for turning on or off a semiconductor switch within a switching power supply PS. Accordingly, these frequencies (hereinafter these frequencies are referred to as "operating frequencies") are required to be selected so as not to interfere with the reception frequency of the tuner.

On the other hand, according to the switching amplifier 100, increasing the frequency of the reference clock of the pulse width modulating unit 101 and reducing the length of the cycle decreases a sampling cycle of the audio signal es that carries out the pulse width modulation. As a result, while the playback quality is improved in terms of the sampling number, the modulation is not carried out properly, and the playback quality is not improved in terms of modulated strains. In other words, as a ratio of times of rising and falling of the PWM signal with respect to the switching cycle increases, and a dynamic range of the sound signal es in which the pulse width modulation is normally carried out becomes narrow, and selection of the frequency of the reference clock is restricted to a certain extent in view of the playback quality.

Further, as the semiconductor switches SW1 and SW2 of the output unit 102 are required to be turned on or off by the PWM signals Sout and /Sout without fail, the selection of the frequency of the reference clock is restricted to a certain extent in terms of responsivity of the semiconductor switches SW1 and SW2.

The operating frequency of the switching amplifier 100 corresponds to the frequency of the PWM signals Sout and /Sout output from the pulse width modulating unit 101, and the frequency is twice as high as the frequency of the reference clock. The frequency of the reference clock is selected in view of the playback quality and the responsivity of the output unit 102, and consequently, an operating frequency fc of the switching amplifier 100 is generally within a range from 300 kHz to 500 kHz.

On the other hand, in AM radio broadcasting within Japan, band frequencies of the carrier waves are assigned to a range on the order of 500 kHz to 1700 kHz, and for example, the carrier waves with 9-kHz pitch and of 124 channels within a range from 522 kHz to 1629 kHz are available.

In particular, since a reception circuit of superheterodyne principle is employed for AM tuners, frequencies that should be avoided so that the operating frequency fc and its harmonic frequency n×fc (where n is an integer of n=2, 3, . . . ) of the switching amplifier 100 do not become interfering waves are not only the carrier frequency f0 (the carrier waves of 124 channels) in a range from 522 kHz to 1629 kHz, but also an intermediate frequency fIF (=455 kHz) and an image frequency fimg (=f0+2×fIF) that is a mirrored image of the carrier frequency f0 centering the intermediate frequency fIF. It is extremely difficult to select a single frequency as the operating frequency fc and use this frequency in a static manner without causing any interference to all the frequencies.

For example, since not all of the 124 channels are used as the carrier waves in all regions, it is possible to ease the condition for the selection and facilitate the selection of the operating frequency fc by setting a condition that no interference is caused to the carrier frequency f0, the intermediate frequency fIF, and the image frequency fimg that are used in each region. However, this method is not practical, as it is necessary to change the operating frequency fc according to selling areas of products, hindering standardization of management in manufacture and manufacturing processes.

Further, it is conceivable that a method of configuring the reference clock of the switching amplifier 100 with a variable frequency clock, and automatically setting the clock frequency of the reference clock that does not interfere the reception of the reception frequency every time when the reception frequency of the tuner is set. However, this method poses problems that the configuration of the reference clock becomes complicated, and that, as it is necessary to select the clock frequency of the reference clock based on the condition for the selection of the frequency for ensuring the playback quality required for the switching amplifier 100 and the responsivity of the output unit 102, the circuit for carrying out the selection process also becomes complicated.

In the case of the switching power supply PS, the operating frequency (switching frequency) often becomes lower than the operating frequency fc of the switching amplifier 100, in general, on the order of several dozen kHz. Similarly, in this case, it is necessary to select the operating frequency so that the operating frequency and the harmonic frequency do not interfere with the carrier wave f0, the intermediate frequency fIF, and the image frequency fimg. Accordingly, the above problems also apply to the selection of the operating frequency of the switching power supply PS.

It is also conceivable that the multiple clock frequencies and the switching frequencies are previously set such that poor reception occurs to a part of a large number of carrier frequencies included in the broadcast wave band that the tuner receives but not to the same carrier frequency, and the clock frequencies and the switching frequencies are switched according to the reception frequency of the tuner.

However, for example, in the case of the clock frequency, when the carrier frequency of the receiving station of the tuner is changed in the state in which the sound signal from the tuner is amplified by the switching amplifier 100, if the clock frequency of the reference clock of the switching amplifier 100 is changed along with this change, the operation of the switching amplifier 100 may possibly become unstable as the frequency of the PWM signal changes dramatically when switching the clock frequency. In the case of the switching power supply, the output voltage is fluctuated and the switching power supply may possibly become unstable.

Therefore, in the case of the switching amplifier, it is preferable that an amplifying operation of the switching amplifier 100 is temporarily suspended when switching the clock frequency, and the amplifying operation is resumed after switching the clock frequency. However, carrying out such a process poses problems that it could give a feeling of strangeness to the user if the amplifying operation of the switching amplifier 100 is suspended or not depending on the presence of the change in the clock frequency when the user has changed the receiving station, and that convenience of the broadcast wave receiving system is impaired. On the other hand, in the case of the switching power supply, it is not preferable to stop outputting in mid-course.

SUMMARY OF THE INVENTION

An object of the present invention is to provide a broadcast wave receiving system capable of automatically setting an operating frequency among multiple operating frequencies, the operating frequency not interfering a reception operation with respect to the reception frequency of the tuner, and capable of preventing poor reception with a simple configuration.

According to a preferred embodiment of the present invention, a broadcast wave receiving system comprises: a broadcast wave receiving unit that receives a carrier signal that has been modulated based on a sound signal broadcasted from a broadcasting station, and that demodulates and outputs the sound signal; a signal transformation processing unit that generates a reference clock and carries out a predetermined signal transformation process by a switching operation based on the reference clock; and a controlling unit that controls the carrier frequency received by the broadcast wave receiving unit and a clock frequency of the reference clock generated by the signal transformation processing unit, wherein the signal transformation processing unit includes: a reference clock generating unit capable of generating a reference clock with a clock frequency that is one of multiple clock frequencies that have been previously set, and the controlling unit includes: a memory unit that stores information in which the multiple clock frequencies that satisfy conditions for predetermined reception interferences to a part of multiple carrier frequencies included in a band frequency of the broadcast wave are previously set so that not all clock frequencies satisfy the conditions for the reception interferences to the same carrier frequencies, the information indicating a relation between each clock frequency and the carrier frequency that includes the reception interference; a reception frequency setting unit that sets the carrier frequency to be received to the broadcast wave receiving unit; a clock frequency determining unit that refers to the information stored in the memory unit and determines a clock frequency that does not include a reception interference to the carrier frequency that is set by the reception frequency setting unit, the determined clock frequency being out of the multiple clock frequencies; and a clock frequency setting unit that sets the clock frequency determined by the clock frequency determining unit to the reference clock generating unit, so that the reference clock generating unit generates a reference clock having the determined clock frequency.

Preferably, the signal transformation processing unit is an amplifying unit that transforms the sound signal into a pulse-width modulated signal with a frequency that is twice as high as the clock frequency of the reference clock by transforming a level of the sound signal to a pulse width during periods in which the reference clock is at a high level and a low level, and that amplifies the sound signal by switching a predetermined direct voltage based on the pulse-width modulated signal.

Preferably, the broadcast wave receiving unit receives the carrier frequency based on a superheterodyne principle, and conditions for the reception interference are expressed as follows, when the carrier frequency is f0, a bandwidth to the carrier frequency is $\Delta F$, $\Delta F'$ ($<\Delta F$), the clock frequency is fmc, an intermediate frequency is fIF, a bandwidth to the intermediate frequency is $\Delta fIF$, image frequency is fimg, and a bandwidth to the image frequency is $\Delta fimg$:

$2 \times n \times fmc = f0 \pm \Delta F$: carrier interference;

$2 \times n \times fmc = fIF \pm \Delta fIF$: intermediate frequency interference;

$2 \times n \times fmc = fimg \pm \Delta fimg$: image frequency interference;

$m \times fmc = f0 \pm \Delta F'$: carrier interference; and $m \times fmc = f0 + 2 \times fIF$: image interference, where n and m are integers not less than one.

According to the present invention, the memory unit stores the information in which, as the clock frequency of the reference clock of the signal transformation unit, the multiple clock frequencies that may cause poor reception to the carrier frequency as a part of the broadcast wave band are previously set so as not to cause poor reception to all of the carrier frequencies with the same clock frequency, the information indicating a relation between each clock frequency and the carrier frequency that includes the reception interference.

Further, when the controlling unit causes the broadcast wave receiving unit to receive the selected carrier frequency according to a user's operation of selecting a station, a clock frequency that may not cause the poor reception to the carrier frequency is set, for example, to the signal transformation processing unit of the switching amplifier, the switching power supply, and the like, thereby generating the reference clock with the clock frequency.

For example, in the case where two clock frequencies fmc1 and fmc2 (>fmc1) are set as a clock frequency fmc of the reference clock, and where the clock frequency fmc1 does not cause the poor reception to a carrier frequency f0 to be received by the broadcast wave receiving unit, but the clock frequency fmc2 causes the poor reception, the clock frequency fmc1 is set to the signal transformation processing unit, and the signal transformation processing unit carries out the predetermined signal transformation process by the switching operation based on the reference clock with the clock frequency fmc1.

For example, in the case where the signal transformation processing unit is the amplifying unit that transforms the sound signal into the pulse-width modulated signal with the frequency that is twice as high as the clock frequency of the reference clock by transforming the level of the sound signal to the pulse width during periods in which the reference clock is at the high level and the low level, and that amplifies the sound signal by switching the predetermined direct voltage based on the pulse-width modulated signal, the sound signal output from the broadcast wave receiving unit is transformed into a pulse-width modulated signal with a frequency that is twice as high as the clock frequency fmc1, and the sound signal is amplified by switching the direct voltage based on the pulse-width modulated signal.

Therefore, it is possible to reliably prevent the amplifying operation of the amplifying unit from interfering the reception operation of the broadcast wave receiving unit.

Further, as fluctuation of the cycle of the pulse-width modulated signal generated by the amplifying unit can be reduced by selecting a range of the two previously set clock frequencies fmc1 and fmc2 so as to decrease expeditiously, it is possible to suppress a disadvantage that a dynamic range of the sound signal that can carry out normal pulse width modulation is adversely narrowed.

Another object of the present invention is to provide a broadcast wave receiving system capable of preventing an operating frequency of a switching amplifier or a switching power supply from adversely changing during a reception operation of a tuner, by automatically setting an operating frequency using a preset function of the tuner so as not to interfere a reception operation with respect to a reception frequency of the tuner, the operating frequency being one of multiple operating frequencies.

According to a preferred embodiment of the present invention, a broadcast wave receiving system comprises: a broadcast wave receiving unit that receives a carrier signal that has been modulated based on a sound signal broadcasted from a broadcasting station, and that demodulates and outputs the sound signal; a signal transformation processing unit that generates a reference clock and carries out a predetermined signal transformation process by a switching operation based on the reference clock; and a controlling unit that controls the carrier frequency to be received by the broadcast wave receiving unit and a clock frequency of the reference clock generated by the signal transformation processing unit, wherein a receiving station registering unit that is operated by a user in order to register multiple broadcasting stations as targets of reception by the broadcast wave receiving unit; and a receiving station memory unit for storing carrier frequencies of the broadcasting stations registered by the receiving station registering unit, wherein the signal transformation processing unit includes: a reference clock generating unit capable of generating a reference clock with a clock frequency that is one of multiple clock frequencies that have been previously set, and the controlling unit includes: a memory unit that stores information in which the multiple clock frequencies that satisfy conditions for predetermined reception interferences to apart of multiple carrier frequencies included in a band frequency of the broadcast wave are previously set so that not all clock frequencies satisfy the conditions for the reception interferences to the same carrier frequencies, the information indicating a relation between each clock frequency and the carrier frequency that includes the reception interference; a receiving station registration processing unit that causes the receiving station memory unit to store multiple carrier frequencies to be registered when a registration operation of the carrier frequencies of the multiple broadcasting stations is carried out by the receiving station registering unit; a clock frequency determining unit that refers to the information stored in the memory unit and determines a clock frequency that does not include a reception interference to any of the multiple carrier frequencies stored in the receiving station memory unit when a registration process of the receiving stations by the receiving station registration processing unit, the determined clock frequency being out of the multiple clock frequencies; and a clock frequency setting unit that sets the clock frequency determined by the clock frequency determining unit to the reference clock generating unit, so that the reference clock generating unit generates a reference clock having the determined clock frequency.

According to the present invention, the memory unit stores the information in which, as the clock frequency of the reference clock of the signal transformation unit, the multiple clock frequencies that may cause poor reception to the carrier frequency as a part of the broadcast wave band are previously set so as not to cause poor reception to all of the carrier frequencies with the same clock frequency, the information indicating a relation between each clock frequency and the carrier frequency that includes the reception interference.

Further, when the controlling unit carries out the registration process of the receiving stations for causing the receiving station memory unit to store the carrier frequencies of the broadcasting stations to be registered by the receiving station registering unit according to the user's operation for registering the receiving stations, the controlling unit refers to the information stored in the memory unit and sets a clock frequency that does not include a reception interference to any of the multiple carrier frequencies stored in the receiving station memory unit to the signal transformation processing unit such as a switching amplifier or a switching power supply, for example, thereby generating the reference clock with the clock frequency.

For example, in the case where two clock frequencies fmc1 and fmc2 (>fmc1) are set as a clock frequency fmc of the reference clock, and where carrier frequencies f01, f02, f03, f04, and f05 of five broadcasting stations are stored in the receiving station memory unit in the registration process of the receiving stations, the clock frequency fmc1 does not cause poor reception to all of the carrier frequencies f01, f02, f03, f04, and f05. On the other hand, in the case where the clock frequency fmc2 causes poor reception, for example, to the carrier frequency f01, the clock frequency fmc1 is set to the signal transformation processing unit, and the clock frequency fmc1 is maintained until the next registration process of the receiving stations is carried out. Consequently, the signal transformation processing unit carries out the predetermined signal transformation process by the switching operation based on the reference clock with the clock frequency fmc1, regardless of whether the receiving station of the broadcast wave receiving unit is changed among the registered receiving stations.

For example, in the case where the signal transformation processing unit is the amplifying unit that transforms the sound signal into the pulse-width modulated signal with the frequency that is twice as high as the clock frequency of the reference clock by transforming the level of the sound signal to the pulse width during periods in which the reference clock is at the high level and the low level, and that amplifies the sound signal by switching the predetermined direct voltage based on the pulse-width modulated signal, the sound signal output from the broadcast wave receiving unit is transformed into a pulse-width modulated signal with a frequency that is twice as high as the clock frequency fmc1, and the sound signal is amplified by switching the direct voltage based on the pulse-width modulated signal.

Therefore, it is possible to reliably prevent the amplifying operation of the amplifying unit from interfering the reception operation of the broadcast wave receiving unit. Further, even if the receiving station of the broadcast wave receiving unit is changed among the registered receiving stations, the clock frequency of the reference clock of the signal transformation processing unit is not switched. Accordingly, it is not necessary to suspend the operation of the signal transformation processing unit to carry out a switching process of the clock frequency, and the signal transformation processing unit can be operated stably.

Further, as fluctuation of the cycle of the pulse-width modulated signal generated by the amplifying unit can be reduced by selecting a range of the two previously set clock frequencies fmc1 and fmc2 so as to decrease expeditiously, it is possible to suppress a disadvantage that a dynamic range of the sound signal that can carry out normal pulse width modulation is adversely narrowed.

BRIEF DESCRIPTION OF THE DRAWINGS

FIG. 6 is a table showing a relation between a carrier frequency of an AM broadcast wave band and two frequencies of a reference clock;

FIG. 7 is a diagram describing a carrier interference, an intermediate frequency interference, and an image interference;

FIG. 10 is a table showing a relation between the carrier frequency of the AM broadcast wave band and four frequencies of the reference clock when there are four reference clocks;

DETAILED DESCRIPTION OF THE PREFERRED EMBODIMENTS

Figure 1:
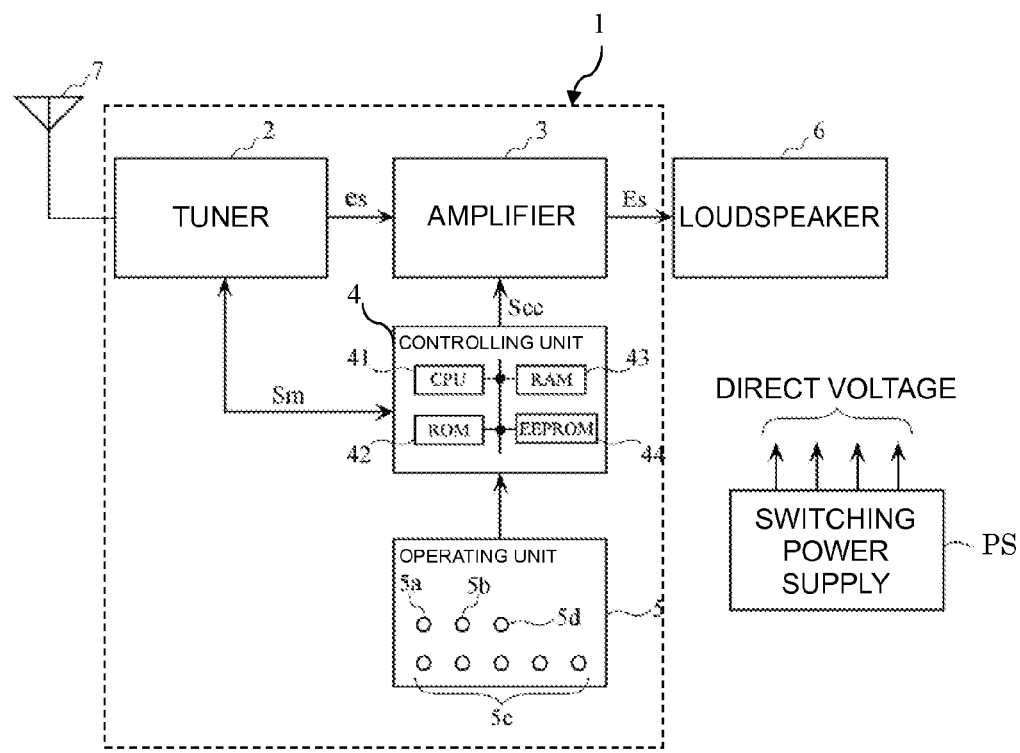
FIG. 1 is a block configuration diagram illustrating a broadcast wave receiving system according to the present invention.

FIG. 1 is a block configuration diagram illustrating a broadcast wave receiving system according to the present invention. A broadcast wave receiving system 1 is provided with a tuner 2 (broadcast wave receiving unit) that receives a broadcast wave, detects a sound signal and outputs the sound signal, an amplifier 3 that amplifies a sound signal es output from the tuner 2, a controlling unit 4 that controls a reception operation of the tuner and an amplifying operation of the amplifier 3, an operating unit 5 for a user to input a reception frequency of the tuner, a loudspeaker 6 that transforms the amplified sound signal es output from the amplifier 3 into mechanical vibration, and a power supply PS that supplies DC power supply to the tuner 2, the amplifier 3, and the controlling unit 4. The power supply PS is configured by a known separately-excited switching power supply, and generates multiple direct voltages necessary to drive the tuner 2, the amplifier 3, and the controlling unit 4, and supplies the respective voltages to the tuner 2, the amplifier 3, and the controlling unit 4.

The broadcast wave receiving system 1 can also be configured as a broadcast wave receiving apparatus in which the tuner 2, the amplifier 3, the controlling unit 4, and the operating unit 5 are integrally built, or can be a system in which the controlling unit 4 and the operating unit 5 are built in the amplifier 3, and the tuner 2 is connected with a dedicated cable.

The tuner 2 is a receiving device that receives AM (Amplitude Modulation) broadcasting. While the present embodiment is described taking a receiving device for AM broadcasting as an example, the tuner 2 can be a receiving device for other radio broadcasting such as FM broadcasting or for other broadcast waves such as television broadcasting or satellite broadcasting.

Figure 2:
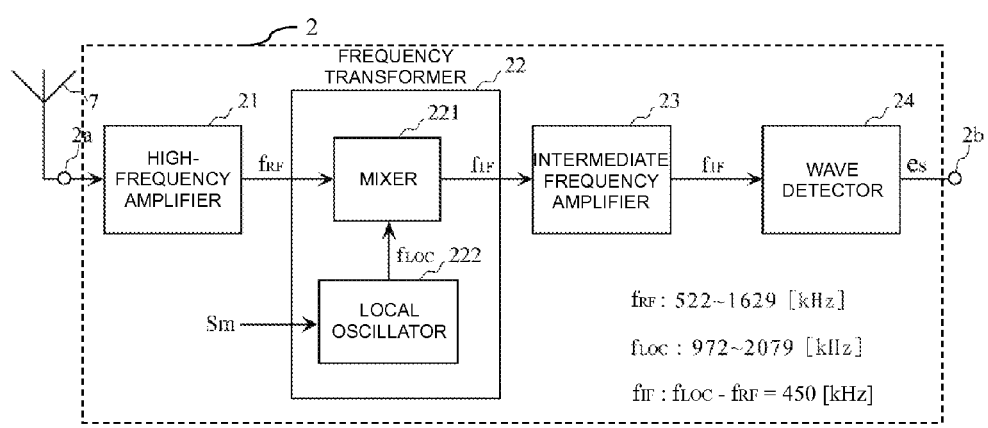
FIG. 2 is a block configuration diagram illustrating a tuner of the broadcast wave receiving system.

The tuner 2 is a known receiving device based on the superheterodyne principle. The tuner 2 is provided with, as shown in FIG. 2, a high-frequency amplifier 21, a frequency transformer 22, an intermediate frequency amplifier 23, and a wave detector 24, which are connected in this order from an input terminal 2a to which the antenna 7 is connected to an output terminal 2b from which the sound signal es is output.

The high-frequency amplifier 21 is a high-frequency amplifying circuit having a gain to an AM broadcast wave band (522 kHz to 1629 kHz in Japan), and amplifies a level of a high-frequency signal $S_{RF}$ of the AM broadcast wave band among broadcast wave signals inputted from the antenna 7. The high-frequency amplifier 21 is provided with a RF filter with a variable center frequency in a range of 522 kHz to 1269 kHz at its first stage, and has a function of receiving the high-frequency signal $S_{RF}$ that the control circuit 4 has instructed the reception by limiting the band frequency of the high-frequency signal $S_{RF}$ inputted from the antenna 7 using the RF filter. The center frequency of the RF filter can be varied based on a command signal Sm of a receiving station inputted from the control circuit 4.

The frequency transformer 22 is a circuit that transforms the high-frequency signal $S_{RF}$ output from the high-frequency amplifier 21 into an intermediate frequency signal $S_{IF}$ (an intermediate frequency $f_{IF}$ is described as a signal of 450 kHz for the sake of simplicity, although it is in general a signal of 455 kHz). The frequency transformer 22 includes a mixer (multiplier) 221 and a the local oscillator 222, and carries out transformation using the mixer 221 into the intermediate frequency signal $f_{IF}$, where frequency ($f_{LOC}+f_{RF}$) and ($f_{LOC}-f_{RF}$)=$f_{IF}$, based on the high-frequency signal $S_{RF}$ (frequency is $f_{RF}$) inputted from the high-frequency amplifier 21 and a local oscillation frequency signal $S_{LOC}$ (frequency is $f_{LOC}$) inputted from the local oscillator 222.

The broadcast waves (carrier waves) of the AM broadcast wave band are available for 124 channels in a 9-kHz step from 522 kHz to 1629 kHz. As the intermediate frequency $f_{IF}$ is fixed to 450 kHz, a broadcast wave to be received (hereinafter the frequency of the broadcast wave is referred to as the "carrier frequency f0") is determined by changing a local oscillation frequency $f_{LOC}$ of the local oscillator 222. In other words, by changing the local oscillation frequency $f_{LOC}$, the broadcast wave of the AM broadcast wave band is selected.

The local oscillator 222 is configured by a variable frequency oscillating circuit, and generates a sine-wave signal from 972 kHz to 2079 kHz based on the command signal Sm of the receiving station inputted from the control circuit 4. Specifically, the local oscillator 222 generates a sine-wave signal that is higher by 450 kHz than the carrier frequency f0 to be received instructed by the command signal Sm. For example, when f0=1000 kHz, the local oscillator 222 generates a sine-wave signal of 1450 kHz.

The intermediate frequency amplifier 23 has a function as an IF filter (bandpass filter) that passes the $f_{IF}$ (that does not pass the ($f_{LOC}+f_{RF}$)) and a function of amplification for the intermediate frequency signal $S_{IF}$ output from the frequency transformer 22. The wave detector 24 demodulates the intermediate frequency signal $S_{IF}$ and detects the sound signal es. The sound signal es is output from the output terminal 2b to the amplifier 3.

Figure 12:
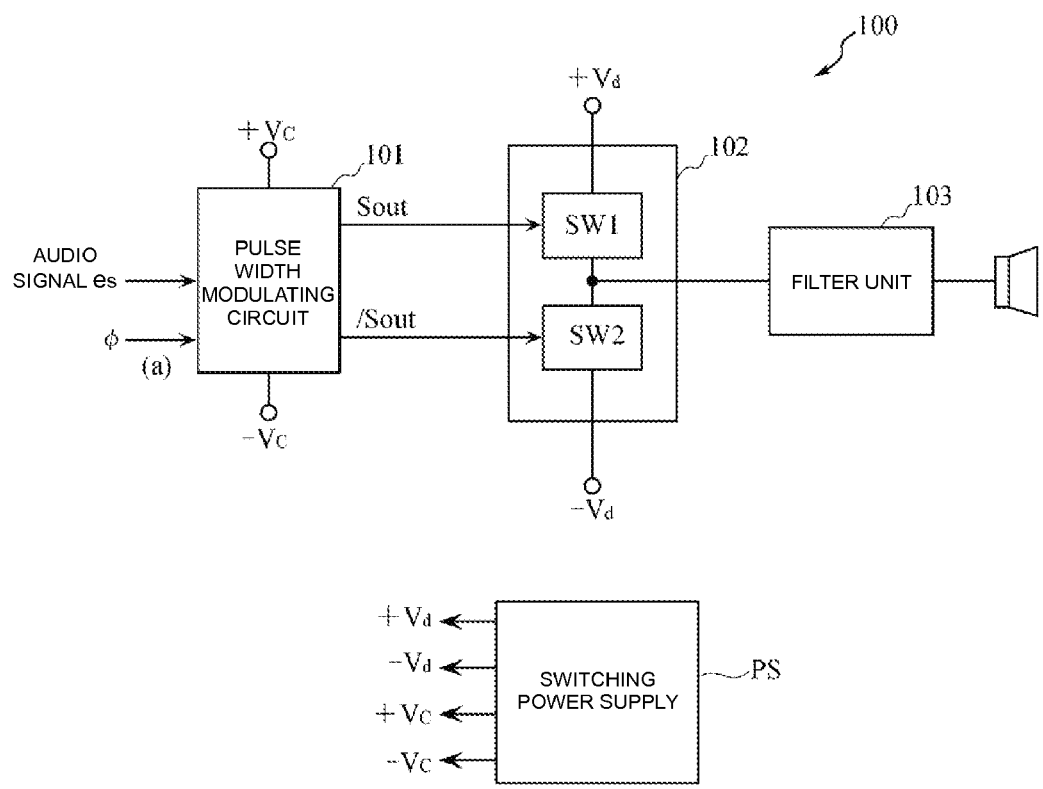
FIG. 12 is a block configuration diagram illustrating a conventional switching amplifier.

The amplifier 3 is a switching amplifier utilizing a pulse width modulating circuit, and essentially has the same configuration as that of the switching amplifier 100 shown in FIG. 12.

Figure 3:
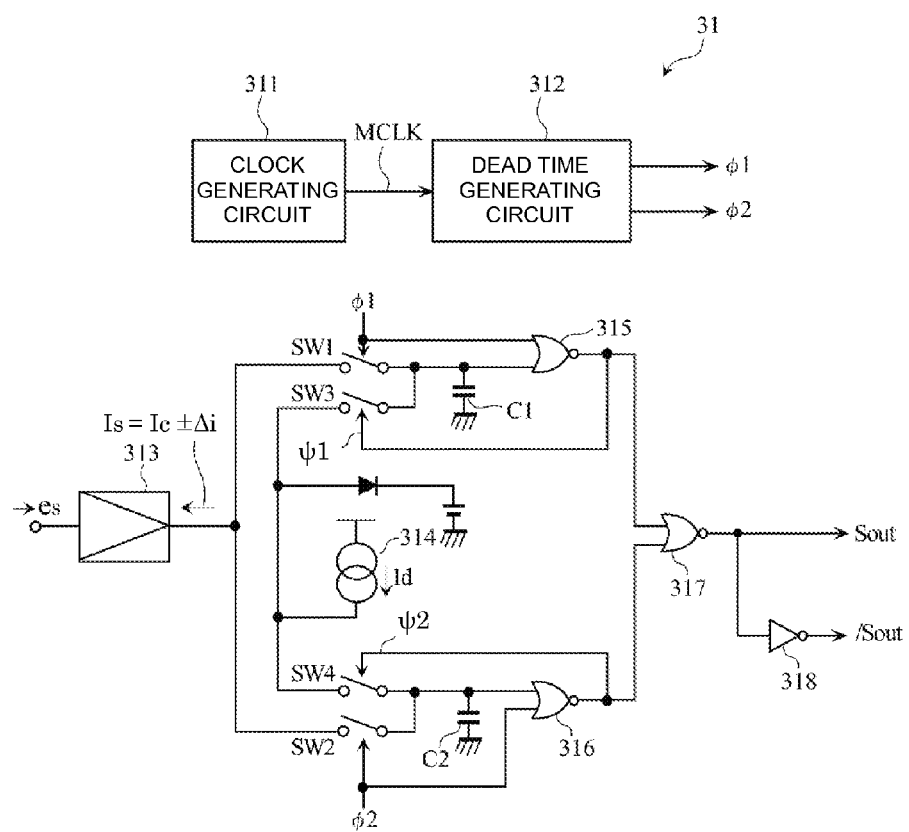
FIG. 3 is a diagram illustrating one example of a circuit configuration of a pulse width modulating circuit in a switching amplifier of the broadcast wave receiving system.
Figure 4:
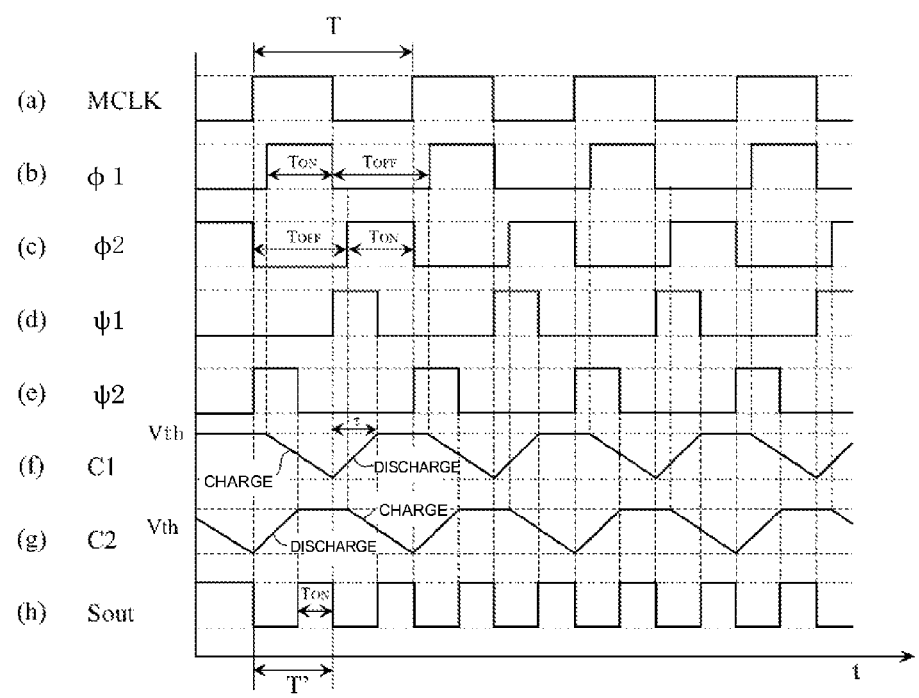
FIG. 4 is a timing chart describing an operation of the pulse width modulating circuit shown in FIG. 3.

FIG. 3 is a diagram illustrating one example of a circuit configuration of a pulse modulating circuit 31 (signal transformation processing unit) in the switching amplifier 3, and FIG. 4 is a timing chart describing an operation of pulse width modulation of the pulse width modulating circuit 31 shown in FIG. 3. FIGS. 3 and 4 are the same as those disclosed in U.S. Pat. No. 7,456,668. Since the invention of the present application has a feature in a method of frequency setting of a reference clock MCLK by a clock generating circuit shown in FIG. 3, the essentials of the operation of pulse width modulation by the pulse modulating circuit 31 will be described below.

The pulse width modulating circuit 31 is configured such that a voltage-current transforming circuit 313 transforms the sound signal es into a current Is having a current value that corresponds to a voltage value of the sound signal es, a first capacitor C1 is charged with the current Is during a first half cycle ($T_{ON}$ period) of the reference clock MCLK generated by a clock generating circuit 311 (reference clock generating unit) and a constant current circuit 314 discharges an accumulated charge of the first capacitor C1 at a constant current Id during a second half cycle ($T_{OFF}$ period), and a second capacitor C2 is charged with the current Is during the second half cycle ($T_{OFF}$ period) of the reference clock MCLK and the constant current circuit 314 discharges an accumulated charge of the second capacitor C2 at the constant current Id during a first half cycle ($T_{ON}$ period) of the next cycle (see waveforms of MCLK, φ1, φ2, C1, and C2 in FIG. 4).

It should be noted that it is not convenient in terms of circuitry if the charge of the first capacitor C1 starts at the same time when the discharge of the second capacitor stops at a rising timing of the reference clock MCLK, and if the discharge of the first capacitor C1 starts at the same time when the charge of the second capacitor starts at a falling timing, the voltage-current transforming circuit 313 and the constant current circuit 314 are respectively connected to the first capacitor C1 and the second capacitor C2 at the same time. Therefore, precisely, a first charge control signal φ1 an a second charge control signal φ2 with slight dead times between timings of the first capacitor C1 to be charged and discharged and timings of the second capacitor C2 to be charged and discharged are generated by a dead time generating circuit 312, and the charge of the first capacitor C1 is controlled by the first charge control signal φ1, and the charge of the second capacitor C2 is controlled by the second charge control signal φ2. In addition, as will be described later, the discharge of the first capacitor C1 is controlled by a first discharge control signal ψ1 and the discharge of the second capacitor C2 is controlled by a second discharge control signal ψ2.

Moreover, in the voltage-current transforming circuit 313, the sound signal es is transformed into the current Is represented by Ic±Δi (Δi<Ic), assuming that Is=Ic (>0) when es=0, +Δi=k·|es| when es>0, and −Δi=k·|es| when es<0, and flows in the direction that the charges are drawn in the first capacitor C1 and the second capacitor C2. In other words, the charge is carried out in the direction that voltage levels of the first capacitor C1 and the second capacitor C2 become negative with respect to the ground level (see a portion in FIG. 4, where waveforms of C1 and C2 are decreased downward to right from a reference level Vth of the waveform). Accordingly, the level of the sound signal es is fluctuated in both positive and negative directions centering "0 v", and the current value of the current Is transformed by the voltage-current transforming circuit 313 is fluctuated within a range of ±Δi (Δi<Ic) centering the Ic. Thus, the first capacitor C1 and the second capacitor C2 are always charged by the current Is in the negative direction.

On the other hand, the current Id of the constant current circuit 314 flows so as to charge the first capacitor C1 and the second capacitor C2, the accumulated charges of the first capacitor C1 and the second capacitor C2 that are charged by the current Is in the negative direction are discharged at a constant current value (see a portion in FIG. 4, where waveforms of C1 and C2 are increased up to the reference level Vth upward to right).

The charge and the discharge of the first capacitor C1 respectively by the current Is and the current Id are carried out respectively during the on-period $T_{ON}$ and the off-period $T_{OFF}$ of the first charge control signal φ1 output from the dead time generating circuit 312. The charge of the first capacitor C1 is controlled by the first charge control signal φ1, and the discharge of the first capacitor C1 is controlled by a signal output from a first NOR circuit 315.

The first NOR circuit 315 is a circuit that generates a pulse that is at the high level during the discharge period of the first capacitor C1 by outputting a negative OR of the level of the first charge control signal φ1 and the voltage level of the first capacitor C1. The pulse that is output from the first NOR circuit 315 corresponds to a single pulse of the PWM signal. A timing at which the output from the first NOR circuit 315 is inverted to the high level is the same as the timing at which the level of the first charge control signal φ1 is inverted to the low level (that is, the timing at which the discharge starts). In addition, the current Id of the constant current circuit 314 is set such that the discharge of the first capacitor C1 (the voltage level of the first capacitor C1 rises up to the reference level Vth) is always completed within the period in which the level of the first charge control signal φ1 is low. Accordingly, the pulse signal output from the first NOR circuit 315 is taken as the first discharge control signal ψ1 that controls switching of a third switch SW3 for discharge control provided between the discharge circuit 314 and the first capacitor C1.

When the first charge control signal φ1 becomes at the high level, a first switch SW1 for charge control provided between the voltage-current transforming circuit 313 and the first capacitor C1 is "closed", and the charge of the first capacitor C1 by the current Is starts. Thereafter, when the first charge control signal φ1 becomes at the low level, the first switch SW1 is "opened", and the charge of the first capacitor C1 stops (see the waveform of C1 in the $T_{oN}$ period of φ1 in FIG. 4).

On the other hand, at the same time when the first charge control signal φ1 becomes the low level, the first discharge control signal ψ1 becomes the high level and the third switch SW3 is "closed", and therefore the discharge of the first capacitor C1 by the constant current Id starts. When the voltage level of the first capacitor C1 increases up to the reference level Vth by this discharge, the output level of the first NOR circuit 315 is inverted to the low level. Accordingly, as the third switch SW3 becomes "opened", and the discharge of the first capacitor C1 stops. As a time period τ from the discharge of the first capacitor C1 starts until the voltage of the first capacitor C1 reaches the reference level Vth is shorter than the off-period $T_{OFF}$ of the first charge control signal φ1, when the voltage level of the first capacitor C1 reaches the reference level Vth, the voltage level is maintained until a timing for start of the next charge (see the waveform of C1 during the $T_{OFF}$ period of φ1 in FIG. 4), and the same charge and discharge operations are repeated thereafter.

The charge and the discharge of the second capacitor C2 respectively by the current Is and the current Id are respectively carried out during the on-period $T_{ON}$ and the off-period $T_{OFF}$ of the second charge control signal φ2 output from the dead time generating circuit 312. The charge of the second capacitor C2 is controlled by the second charge control signal φ2, and the discharge of the second capacitor C2 is controlled by a signal output from a second NOR circuit 316.

The second NOR circuit 316 is a circuit that generates a pulse that is at the high level during the discharge period of the second capacitor C2 by outputting a negative OR of the level of the second charge control signal φ2 and the voltage level of the second capacitor C2. This pulse also corresponds to a single pulse of the PWM signal. The signal that is output from the second NOR circuit 316 is taken as the second discharge control signal ψ2 that controls switching of a forth switch SW4 for discharge control provided between the discharge circuit 314 and the second capacitor C2, due to the same reason as that the signal that is output from the first NOR circuit 315 is used as the first discharge control signal ψ1.

Accordingly, similarly to the charge and the discharge operations of the first capacitor C1 controlled by the first charge control signal φ1 and the first discharge control signal ψ1, the charge and the discharge operations of the second capacitor C2 are also controlled respectively by the second charge control signal φ2 and the second discharge control signal ψ2. A waveform of C2 takes a shape that is delayed by about ½ of a cycle T of the reference clock MCLK from the waveform of the charge and the discharge operations of the first capacitor C1 (see the waveform of C2 during the $T_{oN}$ period and the $T_{OFF}$ period of φ2 in FIG. 4).

The duration of the charge periods of the first capacitor C1 and the second capacitor C2 is fixed to about T/2, a voltage level Vj (hereinafter referred to as, "charge level Vj") of the first capacitor C1 and the second capacitor C2 when the charge operation is completed changes in proportion to the charge current Is. Further, the current when charging the first capacitor C1 and the second capacitor C2 is the constant current Id, and the time period τ (hereinafter this time period is referred to as the "discharge period τ") in which the level rises from the charge level Vj up to the reference level Vth is expressed by τ=(Vth−Vj)/Id. Accordingly, the discharge period τ is proportional to the charge level Vj. Moreover, the charge level Vj is proportional to the amplitude centering "0 v" of the sound signal es, the discharge period τ is proportional to the amplitude centering "0 v" of the sound signal es.

Therefore, a pulse that becomes the high level during the discharge period τ of the first capacitor C1 is output from the first NOR circuit 315, and a pulse that becomes the high level during the discharge period τ of the second capacitor C2 is output from the second NOR circuit 316. These pulses are signals obtained by transforming the amplitude centering "0 v" of the sound signal es into time (pulse-width modulated signal).

Further, as the pulse output from the first NOR circuit 315 is obtained by pulse width modulating the amplitude of the sound signal es during the on-period of the reference clock MCLK, and the pulse output from the second NOR circuit 316 is obtained by pulse width modulating the amplitude of the sound signal es during the off-period of the reference clock MCLK, by generating the negative OR signal of the signal output from the first NOR circuit 315 and the signal output from the second NOR circuit 316 by a third NOR circuit 317, the PWM signal Sout is generated which is obtained by varying a duty cycle ($T_{ON}$/T') of the pulse signal where a cycle T' is ½ of the cycle T of the reference clock MCLK according to the amplitude of the sound signal es. The PWM signal Sout is output as it is from one output terminal OUT1 of the pulse width modulating circuit 31, and output from the other output terminal OUT2 after the phase is inverted (and the PWM signal /Sout is generated) by an inverter 318.

As described above, the frequency fc of the PWM signals Sout and /Sout generated by the pulse width modulating circuit 31 is twice as high as a frequency fmc of the reference clock MCLK generated by the clock generating circuit 311. Further, according to the present embodiment, as described in the section of Problems to be Solved by the Invention, setting the frequency fc of the PWM signals Sout and /Sout within the range from 300 kHz to 500 kHz can possibly cause problems in the operation of receiving AM broadcast waves by a high-frequency amplifying circuit 21 of the tuner 2 and the operation of amplifying the intermediate frequency signal $S_{IF}$ by the intermediate frequency amplifier 23. Therefore, one of two previously set clock frequencies fmc1 and fmc2 is set according to the reception frequency, thereby avoiding these problems.

Figure 5:
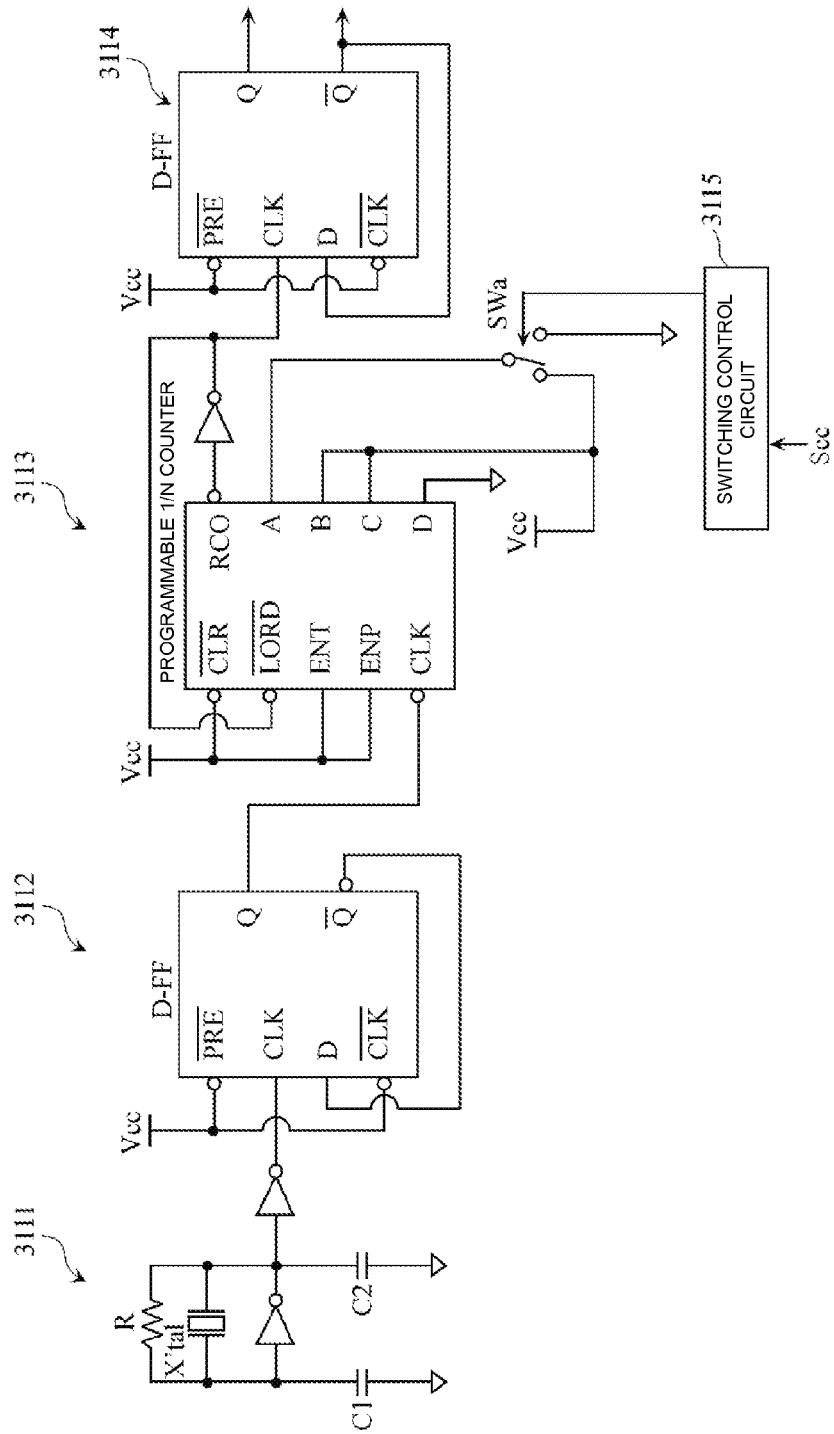
FIG. 5 is a block diagram illustrating one example of a clock generating circuit.

FIG. 5 is a block configurational diagram illustrating one example of the clock generating circuit 311. The clock generating circuit 311 is provided with a pulse oscillating circuit 3111 that generates a pulse signal using a known crystal oscillator and a C-MOS gate, a D flip-flop circuit 3112 that latches the pulse signal output from the pulse oscillating circuit 3111 and generates a clock pulse that is frequency-divided by ½, a programmable 1/N counter 3113 that divides the frequency of the clock pulse output from the D flip-flop circuit 3112 by 1/N, a D flip-flop circuit 3114 that latches the 1/N frequency-divided clock pulse output from the programmable 1/N counter 3113 and further divides its frequency by ½, and a switching control circuit 3115 that switches a ratio of the frequency division of the programmable 1/N counter 3113.

The programmable 1/N counter 3113 is provided with four input terminals A, B, C, and D to which the frequency division ratio N which is a binary number is inputted. According to the present embodiment, in order to generate the reference clock that is one of the clock frequencies fmc1 and fmc2 by switching between two frequency division ratios, the A terminal is connected so as to be switchable by a switch SWa between a Vcc power supply and the ground, the B terminal and the C terminal are connected to the Vcc power supply, and the D terminal is grounded.

Although more details will be described later, the reference clock MCLK of the clock frequencies fmc1 and fmc2 will be briefly described here. According to the present embodiment, for example, a pulse signal of 7.56 MHz is generated by the pulse oscillating circuit 3111 using a crystal oscillator of 7.56 MHz, and this pulse signal is latched by the D flip-flop circuit 3112 to generate a clock pulse of 3.78 MHz. This clock pulse is further frequency-divided by the programmable 1/N counter 3113 into 1/N and latched by the D flip-flop circuit 3114, and finally the clock pulse of 189 kHz or 210 kHz as the reference clock of the clock frequencies fmc1 and fmc2 is output from the D flip-flop circuit 3114.

Although the frequency division ratio of 189 kHz to 7.56 MHz is 1/40, the frequency is divided by the D flip-flop circuit 3112 at a stage before the programmable 1/N counter 3113, and the frequency is also divided by ½ by the D flip-flop circuit 3114 in a succeeding stage. Accordingly, the frequency division ratio at the programmable 1/N counter 3113 is 1/10. Further, although the frequency division ratio of 210 kHz to 7.56 MHz is 1/36, based on the same idea as in the case of 189 kHz, the frequency division ratio at the programmable 1/N counter 3113 is 1/9.

Therefore, at the programmable 1/N counter 3113, any of the N values "9" and "10" by switching the connection of the switch SWa is inputted as a binary number.

Which N value "9" or "10" is to be used, that is, whether to use the frequency fmc of 189 kHz or 210 kHz of the reference clock MCLK, is determined by the controlling unit 4, and a clock control signal Scc that controls the frequency fmc of the reference clock MCLK is inputted from the controlling unit 4 into the clock generating circuit 311 of the pulse width modulating circuit 31. According to the present embodiment, there are two types of the frequency fmc of the reference clock MCLK, and as the control signal Scc uses signals, for example, a signal in which the high level is assigned to "210 kHz", and the low level is assigned to "189 kHz", and the clock generating circuit 311 is provided with the switching control circuit 3115 that transforms the level of the control signal Scc into a signal that controls on and off of the switch SWa.

Referring back to FIG. 1, the controlling unit 4 controls the reception frequency of the tuner 2 and the operating frequency of the switching amplifier 3. The operating frequency of the switching amplifier 3 is a frequency for turning on and off the semiconductor switches SW1 and SW2 of the output unit 102, and is the frequency fc of the PWM signals Sout and /Sout output from the pulse width modulating circuit 31. As described above, since the frequency fc of the PWM signals Sout and /Sout is twice as high as the frequency fmc of the reference clock MCLK, the control of the operating frequency of the switching amplifier 3 is to control the frequency of the clock generating circuit 311 within the pulse width modulating circuit 31. Specifically, it is a control to switch the frequency-division value N of the programmable 1/N counter 3113 within the clock generating circuit 311.

The controlling unit 4 is configured by a microcomputer provided with a CPU (Central Processing Unit) 41, a ROM (Read Only Memory) 42, a RAM (Random Access Memory) 43, an EEPROM (Electrically erasable programmable ROM) 44, and the like. The controlling unit 4 is connected with the operating unit 5 that the user operates to input the reception frequency and the like. The operating unit 5 is provided with operation buttons 5a and 5b for changing the reception frequency upward or downward at a 9-kHz step.

When an operation signal of the operation button 5a is inputted from the operating unit 5 in a state in which the sound signal of the tuner 2 is output from the loudspeaker 6 (the state of listening to the AM broadcast waves), the controlling unit 4 outputs the command signal Sm for increasing the reception frequency higher than the current reception frequency by 9 kHz to the tuner 2 every time when the operation signal is inputted, thereby increasing the receiving station higher than the current receiving station by 9 kHz. On the other hand, when an operation signal of the operation button 5b is inputted from the operating unit 5, the controlling unit 4 outputs the command signal Sm for decreasing the reception frequency lower than the current reception frequency by 9 kHz to the tuner 2 every time when the operation signal is inputted, thereby decreasing the receiving station lower than the current receiving station by 9 kHz.

The controlling unit 4 carries out switching control of the frequency of the reference clock MCLK of the switching amplifier 3 at the same time as the changing control of the receiving station by the operation buttons 5a and 5b. This switching control will be described later.

The broadcast wave receiving system 1 according to the present embodiment has a preset function of assigning the selected carrier frequency f0 to a specific operation button and storing the information. In order to respond to this preset function, the operating unit 5 is provided with multiple operation buttons 5c (for example, operation buttons for five channels) and a preset button 5d for automatically registering the receiving stations to the operation buttons 5c. Information of the carrier frequencies respectively preset to the multiple operation buttons 5c is stored in the EEPROM 44. This information is a table in which each of the multiple operation buttons 5c is previously assigned with a number, for example, and the carrier frequencies f0 of the receiving stations are associated with the numbers of the operation buttons 5c, respectively.

When an operation signal of the preset button 5d is inputted from the operating unit 5, the controlling unit 4 outputs, to the tuner 2, the command signal Sm that scans the receiving station from a minimum frequency (522 kHz) to a maximum frequency (1629 kHz) of the AM broadcast wave band. The tuner 2 increases an oscillation frequency of a local oscillator 222 from 972 kHz up to 2079 kHz by 9-kHz steps, compares the output level of the intermediate frequency amplifier 23 for each reception frequency (carrier frequency f0) with the previously set level (threshold value), and transmits the information of the reception frequency f0 to the controlling unit 4 if the output level is not less than the threshold value.

When the information of the carrier frequency f0 is received from the tuner 2, the controlling unit 4 stores the information in the EEPROM 44 in association with the numbers of the operation buttons 5*c*. After the preset is completed, when the user presses to operate the operation buttons 5*c*, the controlling unit 4 reads the carrier frequency f0 that has been stored in association with the number of the operated operation button 5*c* from the EEPROM 44, and outputs the command signal Sm that takes the carrier frequency f0 as the receiving station to the tuner 2, thereby changing to the receiving station to the receiving station that has been preset to the operation button 5*c*.

The information for controlling the operating frequency of the switching amplifier 3 is stored in the ROM 42 (memory unit). The information is a table of the frequency fmc of the reference clock MCLK that correspond to each carrier frequency f0.

FIG. 6 is a table showing a relation between the carrier frequency f0 of the AM broadcast wave band (522 kHz to 1629 kHz) and the two clock frequencies fmc1 and fmc2 of the reference clock MCLK. The clock frequencies fmc1 and fmc2 in FIG. 6 are 189 kHz and 210 kHz, respectively. A mark "x" in a field for fmc1 or fmc2 represents that this frequency is not selected in order to avoid the reception interference.

Referring to FIG. 6, for the carrier frequency f0 in which the mark "x" is assigned either to the clock frequency fmc1 or fmc2, the frequency without the mark "x" is used as the frequency fmc of the reference clock MCLK, and for the carrier frequency f0 in which the mark "x" is not assigned to neither of the clock frequencies fmc1 and fmc2, one of the frequencies is used as the frequency fmc of the reference clock MCLK.

For example, where f0=828 kHz (NHK Radio 2 in Kinki District), the clock frequency fmc2 is assigned with the mark "x", and the frequency fmc1=189 kHz is used as the frequency fmc of the reference clock MCLK. Further, where f0=1143 kHz (KBS (Kyoto Broadcasting System) in Kinki District), the clock frequency fmc1 is assigned with the mark "x", and the clock frequency fmc2=210 kHz is used as the frequency fmc of the reference clock MCLK. Moreover, where f0=1179 kHz (Mainichi Broadcasting System in Kinki District), neither the clock frequency fmc1 nor fmc2 is assigned with the mark "x", one of 189 kHz and 210 kHz is used as the frequency fmc of the reference clock MCLK. A method of selecting between the clock frequencies fmc1 and fmc2 for each carrier frequency f0 will be described later.

The table in FIG. 6 shows the examples in which two of the frequency fmc of the reference clock MCLK are selected so that a condition that, within a range of 300 kHz to 500 kHz, an operating frequency fc of the switching amplifier 3 does not adversely affect the operation of receiving the AM broadcast waves by the high-frequency amplifying circuit 21 and the operation of amplifying the intermediate frequency signal $S_{IF}$ by the intermediate frequency amplifier 23 of the tuner 2 is satisfied.

The basic condition that the operating frequency fc does not adversely affect the operation of receiving the AM broadcast waves by the high-frequency amplifying circuit 21 and the operation of amplifying the intermediate frequency signal $S_{IF}$ by the intermediate frequency amplifier 23 of the tuner 2 is, as shown in FIG. 7, the operating frequency fc and its n-th harmonic frequency do not cause any of (a) carrier interference, (b) intermediate frequency interference (IF interference), and (c) image frequency interference (image interference).

Considering now about the carrier interference, as the AM broadcast waves has a band frequency Δf of a sideband wave over and under the carrier frequency f0, it is necessary that n×fc does not fall within a range of f0±Δf when the operating frequency fc and its n-th harmonic frequency are expressed by n×fc (where n=1, 2, 3, . . . , and, when n=1, the operating frequency fc).

Further, even when n×fc falls outside the range of f0±Δf, a difference signal between these signals is often detected as a beat and output as a sound signal. Therefore, it is necessary to ensure that a beat signal is not a frequency within an audible field (for example, 20 Hz to 20 kHz). Accordingly, it is necessary that n×fc does not fall within a range of f0±(Δf+Δfbeat), taking a range of the frequency of the beat signal as Δf beat.

In the meantime, considering the band frequency Δf of the sideband wave is ½ of the carrier wave pitch (9 kHz) at maximum, the frequency is 4.5 kHz in the AM broadcast wave band. However, a band-limiting filter (IF filter) having about 9 kHz of a bandwidth Δfbw is used for the intermediate frequency amplifier 23, and it is possible to reliably avoid the reception interference if the level is sufficiently limited with this band-limiting filter. Therefore, according to the present embodiment, the condition for avoiding the carrier interference is that Δf is taken as the bandwidth Δfbw of the band-limiting filter, and n×fc does not fall within the range of f0±(Δfbw+Δfbeat).

Specifically, the condition for avoiding the carrier interference is that, where ΔF=Δfbw+Δfbeat, ΔF that satisfies Δfbw>9 kHz and Δfbeat>15 kHz is set to 30 kHz and n×fc does not fall within f0±ΔF, specifically, as expressed by the following expression.

$$n \times fc \neq f0 \pm \Delta F = f0 \pm 30 \; [\text{kHz}] \quad (1)$$

The intermediate frequency interference (IF interference) is a case where the frequency f0 of a carrier signal is transformed into the intermediate frequency $f_{IF}$ by the intermediate frequency signal, and the same interference as the carrier interference is caused by shifting a frequency range that causes the reception interference from f0±ΔF to $f_{IF}$±ΔF. Accordingly, a conditional expression for avoiding the intermediate frequency interference (IF interference) can be obtained essentially by substituting "f0" with "$f_{IF}$" in the expression (1).

Further, the image interference is caused in the case where the same interference as the carrier interference due to the presence of an image frequency fimg that is a mirrored image of the carrier frequency f0 centering a local oscillating frequency $f_{LOC}$. Accordingly, a conditional expression for avoiding the image interference can be obtained essentially by substituting "f0" with "fimg" in the expression (1).

Figure 8A:
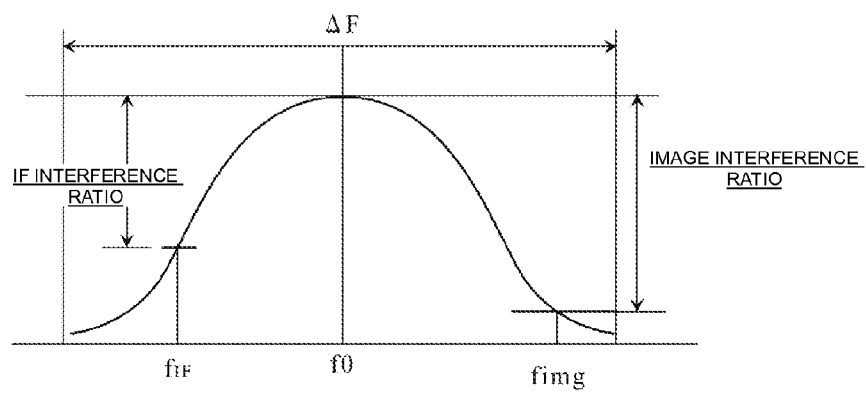
FIGS. 8A and 8B are diagrams showing bandwidths of interferences in the intermediate frequency interference and the image interference.

However, in the high-frequency amplifier 21 of the tuner 2, the carrier frequency f0 to be received is band-limited by the RF filter with a variable center frequency as shown in FIG. 8A. Accordingly, as sensitivity of the intermediate frequency $f_{IF}$ and the image frequency fimg is suppressed to not more than several dozen db with respect to the carrier frequency f0, it is possible to consider that a bandwidth ΔF which is affected by the interference is narrower than the case of the carrier interference.

Figure 8B:
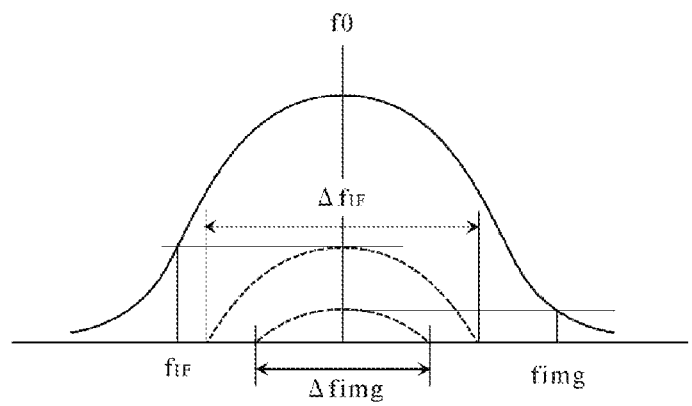

Specifically, as shown in FIG. 8B, in the intermediate frequency interference, it is sufficient to set a bandwidth $\Delta f_{IF}$ in which a level is present when a peak level of the carrier frequency f0 is reduced to a peak level of the intermediate frequency $f_{IF}$ as the bandwidth $\Delta F$ which is affected by the interference, and in the image interference, it is sufficient to set a band frequency $\Delta fimg$ in which a level is present when the peak level of the carrier frequency f0 is reduced to a peak level of the image frequency fimg as the bandwidth $\Delta F$ which is affected by the interference.

Accordingly, the conditional expressions for avoiding the intermediate frequency interference and the image interference are respectively expressed as follows.

$$n \times fc \neq f_{IF} \pm \Delta f_{IF}$$

$$n \times fc \neq fimg \pm \Delta fimg$$

Although the bandwidth $\Delta F$ which is affected by the interference is set to 30 kHz in the case of the carrier interference, the bandwidth $\Delta f_{IF}$ is on the order of several kHz in the case of the intermediate frequency interference, and the bandwidth $\Delta fimg$ is vanishingly small in the case of the image interference. Accordingly, in the present embodiment, since an IF interference ratio is 20 to 30 dB and an image interference ratio is about 50 dB, assuming that $\Delta f_{IF}$ is 20 kHz and $\Delta fimg$ is 6 kHz, the following expressions are taken as the conditional expressions for avoiding the reception interference:

$$n \times fc \neq f0 \pm \Delta F = f0 \pm 30 \text{ [kHz]} \tag{2}$$

$$n \times fc \neq f_{IF} \pm \Delta f_{IF} = f_{IF} \pm 20 \text{ [kHz]}. \tag{3}$$

$$n \times fc \neq fimg \pm \Delta fimg = f0 + 2 \times f_{IF} \pm \Delta fimg = f0 + 900 \pm 6 \text{ [kHz]} \tag{4}$$

where n is an integer not less than 1, $fc=2 \times fmc$, and $f_{IF}=450$ kHz.

In the mean time, these conditional expressions (2) to (4) are relations regarding the operating frequency fc of the switching amplifier 3 and the carrier frequency f0, however, as the switching amplifier 3 generates the reference clock MCLK that is the ground of the operating frequency fc, it is also necessary consider the carrier interference and the image interference for the frequency fmc of the reference clock MCLK, similarly to the operating frequency fc.

For the frequency fmc of the reference clock MCLK, a conditional expression that is similar to the conditional expression for the operating frequency fc can be considered for the carrier interference and the image interference, but the level of the frequency fmc of the reference clock MCLK is smaller to a large extent than the level of the operating frequency fc and its harmonic level (for example, on the order of −50 dB). Accordingly, the bandwidth $\Delta F$ and the bandwidth $\Delta fimg$ in the image interference in the carrier interference can be narrower than the case of the operating frequency fc.

According to the present embodiment, the bandwidth $\Delta F$ in the carrier interference is 6 kHz and the bandwidth $\Delta fimg$ in the image interference is ignored, and conditional expressions for avoiding the carrier interference and the image interference for the frequency fmc of the reference clock MCLK are as follows:

$$m \times fmc \neq f0 \pm 6 \text{ [kHz]} \tag{5}$$

$$m \times fmc \neq = f0 + 900 \text{ [kHz]} \tag{6}$$

where m is an integer not less than 1.

It should be noted that radiation of the reference clock MCLK is −50 dB with respect to the radiation of the operating frequency fc and image interference ratio>100 dB, therefore is considered to give no influence as being in the noise.

Then, the clock frequencies fmc1 and fmc2 of the reference clock MCLK in the table shown in FIG. 6 are set to the frequencies that is divided by an oscillation frequency 7.56 MHz of crystal oscillator, satisfies 300 kHz≦2×fmc1 and 2×fmc2≦500 kHz, and can be used for the carrier frequency f0 by applying the expressions (2) to (6) to the clock frequencies fmc1 and fmc2.

Specifically, as fmc=7560/N, the frequency-division value N that satisfies 300≦2×7560/N≦500 is an integer that is N=31 to N=50. In the present embodiment, as it is preferable that fluctuation width of the frequencies of the PWM signals Sout and /Sout is expeditiously small, two N values of "36" and "40" that are relatively proximate out of N=31 to N=50 (that is, obtained from a simple frequency division ratio of 9:10) are selected (however, the range of $f_{IF} \pm \Delta f_{IF}$ (430 to 470) is avoided when n=1, 2 in order to satisfy the condition of the expression (3)), a frequency of 189 kHz that is frequency-divided where N=40 is set as the clock frequency fmc1 which is one reference clock MCLK, and a frequency of 210 kHz that is frequency-divided where N=36 is set as the clock frequency fmc2 which is the other reference clock MCLK.

When the conditional expressions (2) to (6) in the above are applied for the clock frequency fmc1, the frequency fmc1 can cause the poor reception in the carrier frequency f0 that satisfies the following expressions.

$$f0=(2 \times 189 \times n - 30) \text{ to } f0=(2 \times 189 \times n + 30) [kHz] \tag{7}$$

$$f0=2 \times 189 \times n \pm 6\text{-}900 \text{ [kHz]} \tag{8}$$

$$f0=189 \times n \pm 6 \text{ [kHz]} \tag{9}$$

$$f0=189 \times n - 900 \text{ [kHz]} \tag{10}$$

The obtained carrier frequency f0 within a range of 522 kHz to 1629 kHz that satisfies the expression (7) is f0=726 to f0=786, f0=1104 to f0=1164, f0=1482 to f0=1542 [kHz], the carrier frequency f0 that satisfies the expression (8) is f0=606 to f0=618, f0=984 to f0=996, f0=1362 to f0=1374 [kHz], the carrier frequency f0 that satisfies the expression (9) is f0=561 to f0=573, f0=751 to f0=763, f0=939 to f0=961, f0=1128 to f0=1140, f0=1317 to f0=1329, f0=1506 to f0=1518 [kHz], and the carrier frequency f0 that satisfies the expression (10) is f0=612, 801, 990, 1179, 1338, 1557[kHz].

The conditional expressions (2) to (6) in the above applied for the frequency fmc2 are obtained by substituting "189" to "210" in the expressions (7) to (10), and the frequency fmc2 can cause the poor reception in the carrier frequency f0 that satisfies the following expressions.

$$f0=(2 \times 210 \times n - 30) \text{ to } f0=(2 \times 210 \times n + 30) [kHz].$$

$$f0=2 \times 210 \times n \pm 6\text{-}900 \text{ [kHz]} \tag{12}$$

$$f0=210 \times n \pm 6 \text{ [kHz]} \tag{13}$$

$$f0=210 \times n - 900 \text{ [kHz]} \tag{14}$$

The carrier frequency f0 within a range of 522 kHz to 1629 kHz that satisfies the expression (11) is f0=810 to f0=870, f0=1230 to f0=1290 [kHz], the carrier frequency f0 that satisfies the expression (12) is f0=774 to f0=786, f0=1194 to f0=1206, f0=1614 to f0=1626 [kHz], the carrier frequency f0 that satisfies the expression (13) is f0=624 to f0=636, f0=834 to f0=846, f0=1044 to f0=1056, f0=1254 to f0=1266, f0=1464 to f0=1476 [kHz], and the carrier frequency f0 that satisfies the expression (14) is f0=570, 780, 990, 1200, 1410, and 1620 [kHz].

In the table of FIG. 6, the frequency to which the mark "x" is assigned in the field for "fmc1" and "fmc2" is the above carrier frequency f0. It should be noted that in the table of FIG. 6, the mark "x" is assigned to the frequencies proximate to the carrier frequency f0 within a range of ±6 kHz.

Figure 9:
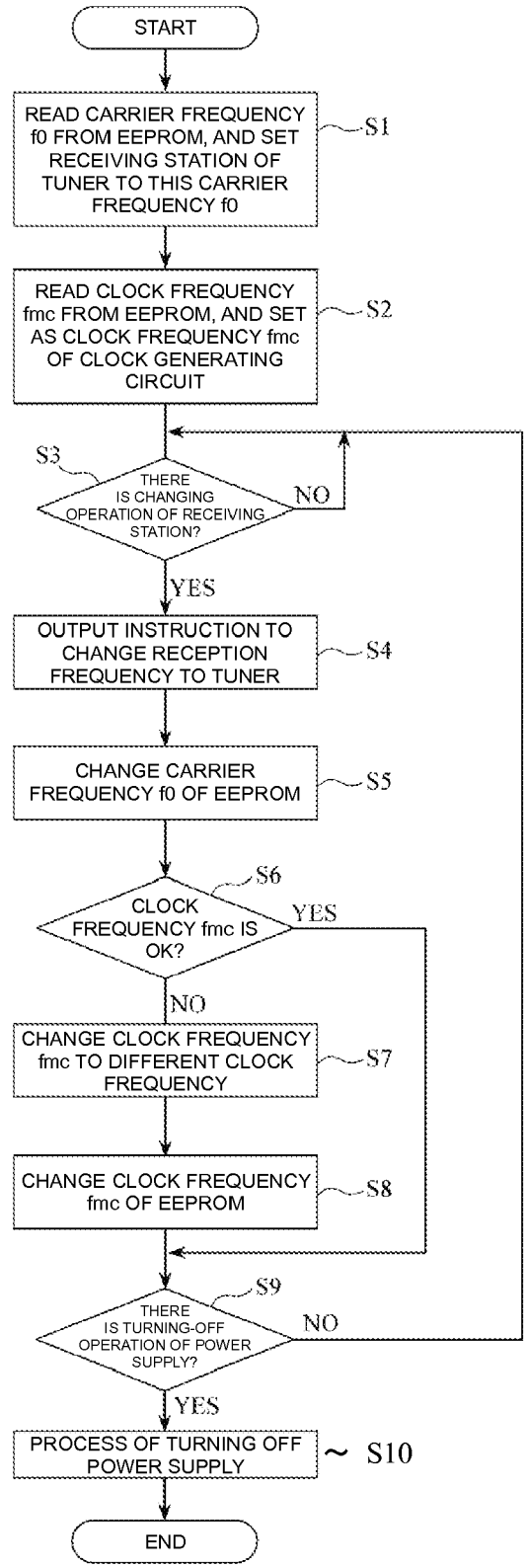
FIG. 9 is a flowchart showing procedures of frequency switching of the reference clock of the switching amplifier.

Next, the control of the frequency switching of the reference clock MCLK by the switching amplifier 3 using the table of FIG. 6 will be described. FIG. 9 is a flowchart showing procedures of the frequency switching of the reference clock MCLK of the switching amplifier 3.

The control of the frequency switching by the reference clock MCLK of the switching amplifier 3 is to select the clock frequency that does not cause the poor reception out of the two clock frequencies fmc1 and fmc2, according to the frequency (carrier frequency f0) of the receiving station of the tuner 2.

The broadcast wave receiving system 1 according to the present embodiment is provided with a function of holding the carrier frequency f0 of the receiving station of the tuner 2 and the clock frequency fmc of the reference clock MCLK of the switching amplifier 3 at this time when an operation of turning off a main power supply by the operating unit 5 is carried out, and then carrying out initialization of the held carrier frequency f0 and the held clock frequency fmc respectively to the tuner 2 and the switching amplifier 3 when an operation of turning on the main power supply is carried out thereafter.

Accordingly, when the operation of turning on the main power supply of the broadcast wave receiving system 1 is carried out by the user through the operating unit 5, the CPU 41 (reception frequency setting unit, clock frequency determining unit and clock frequency setting unit) reads information regarding the carrier frequency f0 and the clock frequency fmc of the reference clock MCLK from the EEPROM 44, and transmits the command signal Sm to the tuner 2 for adjusting the receiving station to this carrier frequency f0. In addition, the CPU 41 transmits information of the clock frequency fmc to the clock generating circuit 311 of the switching amplifier 3, thereby setting states of the tuner 2 and the switching amplifier 3 to the state immediately before the main power supply is turned off last time (S1, S2).

Subsequently, when an operation signal that specifies the receiving station is inputted from the operating unit 5 (S3: YES), the CPU 41 outputs the command signal Sm for instructing the reception of the receiving station corresponding to this operation signal to the tuner 2 (S4), and changes the carrier frequency f0 of the receiving station stored in the EEPROM 44 to the carrier frequency f0 of the instruction (S5).

Examples of the operation signal for specifying the receiving station that is inputted from the operating unit 5 mainly include an instruction of changing a 9-kHz step reception frequency based on the operation of the operation buttons 5a and 5b and an instruction of changing to a preset receiving station based on the operation of the multiple operation buttons 5c. In either case, the CPU 41 is able to learn the frequency f0 (carrier frequency f0) of the receiving station to be changed, and therefore the CPU 41 then refers to the table of FIG. 6 and determines whether or not the clock frequency fmc that is currently set to the clock generating circuit 311 of the switching amplifier 3 for the carrier frequency f0 (S6).

For example, in the case where the current clock frequency fmc is fmc1 (189 kHz), it is determined whether the mark "x" is assigned to fmc1 to the specified carrier frequency f0 in the table of FIG. 6. It is also possible that, instead of the table of FIG. 6, only the carrier frequencies f0 that are not usable for the clock frequencies fmc1 and fmc2 are registered to the ROM 42, and whether the specified carrier frequency f0 is included in the registration content of the clock frequency fmc1 is determined.

When it is determined to be unusable in step S6 (S6: NO), the CPU 41 outputs a command signal Sc to the clock generating circuit 311 to set the frequency-division value N=18, and switches the frequency of the reference clock MCLK generated by the clock generating circuit 311 to the clock frequency fmc2 (210 kHz) (S7), and changes the clock frequency fmc stored in the EEPROM 44 from the clock frequency fmc1 to the clock frequency fmc2 (S8), and then the process moves to step S9. On the other hand, when it is determined to be usable in step S6 (S6: YES), the CPU 41 skips steps S7 and S8, and holds the frequency of the reference clock MCLK generated by the clock generating circuit 311 as the clock frequency fmc1, and then the process moves to step S9.

In step S9, the CPU 41 determines whether the operation signal for turning off the main power supply is inputted from the operating unit 4. If not inputted (S9: NO), the process returns to step S3, and if the operation signal for turning off the main power supply is inputted from the operating unit 4 (S9: YES), a process of turning-off power supply is carried out (S10), and then the process ends.

According to the broadcast wave receiving system 1 of the present embodiment, multiple clock frequencies fmcj (j=1, 2, ..., n, where n is the number of the frequencies) that can cause poor reception to the carrier frequency f0 as a part of the AM broadcast wave band are previously set as the clock frequency fmc of the reference clock MCLK of the switching amplifier 3 such that all of the clock frequencies fmcj do not cause reception to the same carrier frequency f0, and, when the tuner 2 receives the carrier frequency f0 selected according to the user's operation of selecting a station, the reference clock MCLK is generated by setting the clock frequencies fmcj that do not cause reception to the carrier frequency f0 to the clock generating circuit 311 of the switching amplifier 3. Therefore, it is possible to reliably prevent the amplifying operation by the switching amplifier 3 from interfering the reception operation of the tuner 2.

Further, as the number of the previously set clock frequencies fmc is decreased (two at minimum) and a range of the multiple clock frequencies that are set is expeditiously reduced, the fluctuation of the cycle of the PWM signals Sout and /Sout generated by the switching amplifier 3 is also small. Accordingly, it is possible to suppress the disadvantage that the dynamic range of the sound signal es in which the pulse width modulation can be carried out normally is narrowed.

According to the embodiment described above, while the number of the clock frequencies fmc of the reference clock MCLK is two, but the number of the clock frequencies fmc can be three or more. For example, when four clock frequencies fmc of fmc1=168 kHz, fmc2=179 kHz, fmc3=192 kHz, and fmc4=207 kHz are set, by applying the conditional expressions (2) to (6) to each of the clock frequencies fmc1 to fmc4 to calculate the carrier frequency f0 that can cause the poor reception, a table as shown in FIG. 10 can be obtained.

For the switching operation of the clock frequency when the number of the clock frequencies fmc is four, it is not possible to apply the control shown in the flowchart in FIG. 9, as in the case of the number of the clock frequencies fmc is two, in which, it is determined whether or not the carrier frequency f0 of the receiving station that specifies the currently set clock frequency fmc is usable, and the switching to another clock frequency fmc is carried out when not usable.

In this case, it is determined whether or not the carrier frequency f0 of the receiving station that specifies the currently set clock frequency fmc is usable, and when not usable, a usable clock frequency fmc is determined out of the three other clock frequencies fmc using the table shown in FIG. 10, and the command signal Sc is output to the clock generating circuit 311 so as to set this clock frequency fmc.

In the meantime, in the case where the carrier frequency f0 of the receiving station is changed in the state in which the sound signal of the broadcast wave received by the tuner 2 is amplified by the switching amplifier 3 and output from the loudspeaker 6, if the clock frequency fmc of the reference clock MCLK of the switching amplifier 3 is changed along with this change, the operation of the switching amplifier 3 may become unstable due to a rapid change of the frequency of the PWM signals Sout and /Sout when switching the clock frequency fmc.

Accordingly, it is preferable that the operation of pulse width modulation by the switching amplifier 3 is temporarily suspended when switching the clock frequency fmc and the operation of pulse width modulation is resumed after switching the clock frequency fmc of the clock generating circuit 311. However, carrying out such a process is not preferable as it poses problems that it could give a feeling of strangeness to the user if the operation of pulse width modulation by the switching amplifier 3 is suspended or not depending on the presence of the change in the clock frequency fmc when the user has changed the receiving station, and that convenience of the broadcast wave receiving system 1 is impaired.

On the other hand, regarding the AM broadcast waves, not all the carrier frequencies f0 of AM broadcast wave band are used in all the regions, and the number of major broadcasting stations in each region is limited. Examples of the major AM broadcasting stations in Osaka region in Kinki District include Radio Kansai (f0=558 kHz), NHK Radio 1 (f0=666 kHz), NHK Radio 2 (f0=828 kHz), ABC (Asahi Broadcasting Corporation) (f0=1008 kHz), KBS (f0=1143 kHz), Mainichi Broadcasting System (f0=1179 kHz), Osaka Broadcasting Corporation (f0=1314 kHz), and Wakayama Broadcasting System (f0=1431 kHz).

Therefore, a typical tuner is provided with a preset function for previously registering receiving stations, and the broadcast wave receiving system 1 according to the present embodiment is also provided with this preset function, and, for example, a user in Osaka region can preset a desired broadcasting station to the operation buttons 5c out of the above listed broadcasting stations.

When listening to a specific broadcasting station in the user's residence area using the preset function, it is not necessary to use the table of FIG. 6 showing the relation between all the carrier frequencies f0 and the clock frequencies fmc that can cause the reception interference. It is sufficient if the clock frequency fmc that can cause the reception interference only to the carrier frequency f0 of the preset receiving station is taken into account. In this case, only a limited number of the receiving stations are preset, and it is highly possible that the clock frequency fmc that do not cause the reception interference to all of the carrier frequencies f0 of the receiving station are set.

Therefore, the broadcast wave receiving system 1 according to the present embodiment is configured such that, when the user presets a desired receiving station to the operation buttons 5c, the table of FIG. 6 is referred to, the clock frequency fmc that does not cause the poor reception to the carrier frequency f0 is determined, and this clock frequency fmc is set to the clock generating circuit 311 of the switching amplifier 3, and that the clock frequency fmc of the clock generating circuit 311 is held unless the user changes the content of the preset.

Taking the receiving stations in Osaka region as described above as an example, if the user presets five stations including Radio Kansai (f0=558 kHz), NHK Radio 1 (f0=666 kHz), ABC (f0=1008 kHz), KBS (f0=1143 kHz), and Mainichi Broadcasting System (f0=1179 kHz), referring to the table of FIG. 6, since the clock frequency fmc that does not cause the poor reception to the carrier frequencies f0 of these broadcasting stations is fmc2=210 kHz, the clock frequency fmc2=210 kHz is set to the clock generating circuit 311 of the switching amplifier 3.

Figure 11:
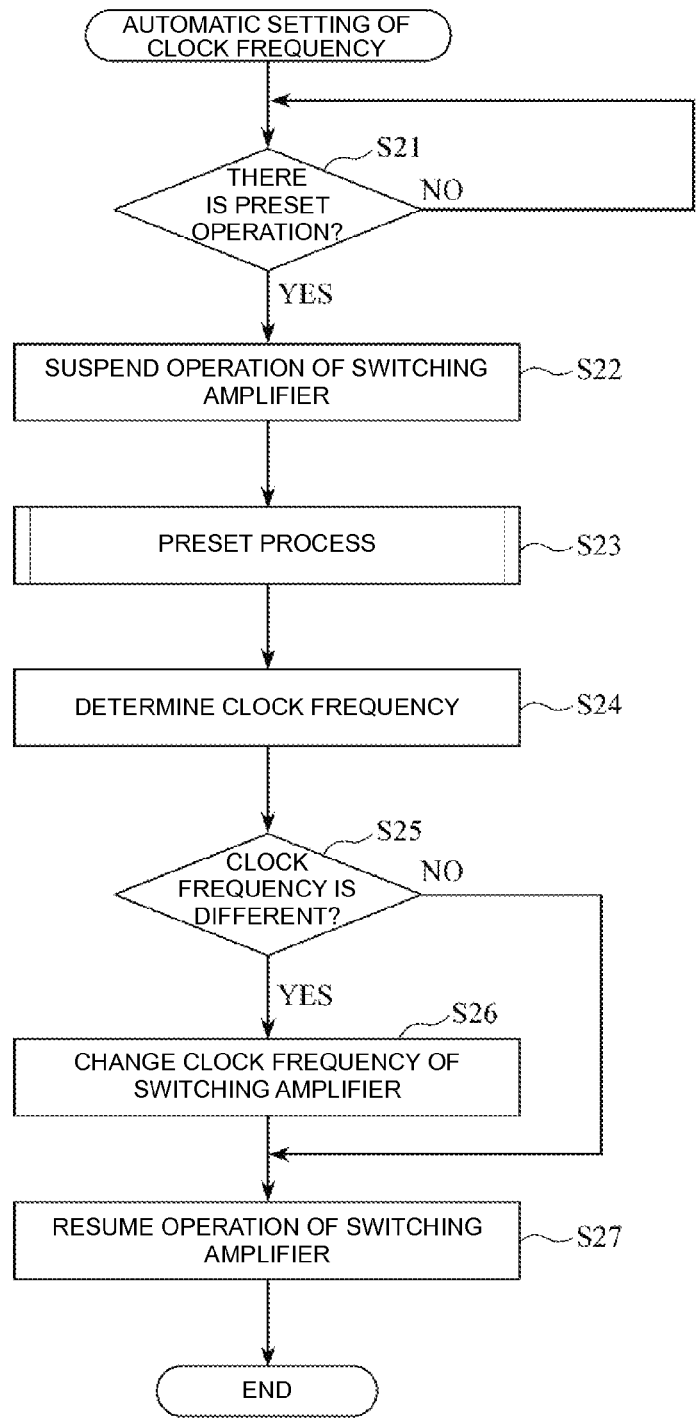
FIG. 11 is a flowchart showing procedures of automatic setting of the clock frequency in presetting of the receiving station.

FIG. 11 is a flowchart showing procedures of automatic setting of the clock frequency fmc in presetting of the receiving station. According to the flowchart of FIG. 11, in the case where the operation signal of the preset button 5d is inputted from the operating unit 5 when the tuner 2 is carrying out the reception operation (S21: YES), the controlling unit 4 (more precisely, the CPU 41) outputs a command signal for suspending the operation to the switching amplifier 3 to suspend the operation of pulse width modulation (S22). The switching amplifier 3 suspends the amplifying operation, for example, by stopping to output the reference clock of the clock generating circuit 311, or by stopping to output the PWM signals Sout and /Sout of the pulse width modulating circuit 31.

Further, the controlling unit 4 carries out a preset process of assigning and registering the five carrier frequencies f0 whose level of the carrier signal is not less than a predetermined threshold value to the five operation buttons 5c, respectively (S23). In the preset process, the controlling unit 4 outputs the command signal Sm to the tuner 2 to scan the receiving station from 522 kHz toward 1629 kHz within the AM broadcast wave band, and causes the tuner 2 to detect the carrier frequency f0 whose level of the carrier signal is not less than the predetermined threshold value. Then, every time when detection information of the carrier frequency f0 whose level is not less than the threshold value is received from the tuner 2, the controlling unit 4 registers (stores) the carrier frequency f0 to the EEPROM 44 in association with the five operation buttons 5c in an ascending order of their numbers. It should be noted that 6 or more pieces of detection information of the carrier frequency f0 whose level is not less than the threshold value are often returned from the tuner 2, and, in this case, the preset process for the sixth carrier frequency f0 and thereafter is not carried out.

Upon completion of the preset process, the controlling unit 4 reads the five carrier frequencies f0 that have been preset from the EEPROM 44, and refers to the table of FIG. 6 and determines the clock frequency fmc that does not cause the poor reception to the carrier frequencies f0 (S24). Then, the controlling unit 4 determines whether or not the clock frequency fmc is different from the clock frequency fmc that is currently set to the clock generating circuit 311 of the switching amplifier 3 (S25).

Then, when it is determined that the clock frequency fmc is different (S25: YES), the controlling unit 4 outputs information of the newly set clock frequency fmc to the switching amplifier 3 and changes the clock frequency fmc of the clock generating circuit 311 (S26). Subsequently, the controlling unit 4 outputs a command signal for starting operation to the switching amplifier 3 and resumes the operation of pulse width modulation (S27), and thus the automatic setting process of the clock frequency fmc ends. On the other hand, when it is determined that the clock frequency fmc is the same (S25: YES), the controlling unit 4 immediately outputs the command signal for starting operation to the switching amplifier 3 without carrying out the process of step S26 and resumes the operation of pulse width modulation (S27), and thus the automatic setting process of the clock frequency fmc ends.

According to the automatic setting function of the clock frequency fmc in the preset process, when the user presets the desired receiving station, the clock frequency fmc that does not interfere the reception of the carrier frequency f0 of the receiving station is automatically set. Accordingly, when listening to the receiving station preset by the user, changing the receiving station does not suspend the amplifying operation of the switching amplifier 3, and therefore the poor reception is reliably prevented without reducing the convenience of the broadcast wave receiving system 1.

In the above embodiment, the clock frequency fmc of the clock generating circuit 311 of the pulse width modulating circuit 31 that determines the operating frequency fc of the switching amplifier 3 has been described. However, as the switching frequency of the switching power supply PS also possibly causes the poor reception to the carrier frequency f0 received by the tuner 2, it is preferable to switch the frequency as in the case of the clock frequency fmc.

Examples of the switching power supply PS are divided, depending on the number of switching devices that are connected to a first winding of a transformer, into a single-switching type such as a flyback type and a forward type, and a multi-switching type such as a push-pull type, a half-bridge type, and a full-bridge type. Various circuit types are known for each type, but the mainstream of the on-off control of the switching devices is the PWM control using the PWM signals.

Therefore, the switching power supply PS is provided with a clock generating circuit that generates the PWM signal for driving the switching device, similarly to the switching amplifier 3. However, it is possible that, multiple switching frequencies that may cause the poor reception to the carrier frequency f0 as a part of the AM broadcast wave band are previously set as the switching frequency of the clock generating circuit such that all of the switching frequencies do not cause the poor reception to the same carrier frequency f0, and a switching frequency that do cause the poor reception to the carrier frequency f0 may be set as the switching frequency of the switching power supply when the selected carrier frequency f0 is received by the tuner 2 according to the user's operation of selecting a station.

What is claimed is:

1. A broadcast wave receiving system, comprising:
a broadcast wave receiving unit that receives a carrier signal that has been modulated based on a sound signal broadcasted from a broadcasting station, and that demodulates and outputs the sound signal;
a signal transformation processing unit that generates a reference clock and carries out a predetermined signal transformation process by a switching operation based on the reference clock; and
a controlling unit that controls a carrier frequency of the carrier signal received by the broadcast wave receiving unit and a clock frequency of the reference clock generated by the signal transformation processing unit, wherein the signal transformation processing unit includes:
a reference clock generating unit capable of generating a reference clock with a clock frequency that is one of multiple clock frequencies that have been previously set, and
the controlling unit includes:
a memory unit that stores information including the multiple clock frequencies, wherein the multiple clock frequencies satisfy conditions for predetermined reception interferences so that, for each of multiple carrier frequencies included in a band frequency of the broadcast wave, not all clock frequencies satisfy the conditions for the reception interferences, the information indicating a relation between each clock frequency and the carrier frequency that includes the reception interference;
a reception frequency setting unit that sets the carrier frequency to be received to the broadcast wave receiving unit;
a clock frequency determining unit that refers to the information stored in the memory unit and determines a clock frequency that does not include a reception interference to the carrier frequency that is set by the reception frequency setting unit, the determined clock frequency being out of the multiple clock frequencies; and
a clock frequency setting unit that sets the clock frequency determined by the clock frequency determining unit to the reference clock generating unit, so that the reference clock generating unit generates a reference clock having the determined clock frequency,
wherein the broadcast wave receiving unit receives the carrier frequency based on a superheterodyne principle, and
conditions for the reception interference are expressed as follows, when the carrier frequency is f0, a bandwidth to the carrier frequency is $\Delta F$, $\Delta F'(<\Delta F)$, the clock frequency is fmc, an intermediate frequency is fIF, a bandwidth to the intermediate frequency is $\Delta fIF$, image frequency is fimg, and a bandwidth to the image frequency is $\Delta fimg$:

$2 \times n \times fmc = f0 \pm \Delta F$: carrier interference;

$2 \times n \times fmc = fIF \pm \Delta fIF$: intermediate frequency interference;

$2 \times n \times fmc = fimg \pm \Delta fimg$: image frequency interference;

$m \times fmc = f0 \pm \Delta F'$: carrier interference; and $m \times fmc = f0 + 2 \times fIF$: image interference, where n and m are integers not less than one.

2. The broadcast wave receiving system according to claim 1, wherein
the signal transformation processing unit is an amplifying unit that transforms the sound signal into a pulse-width modulated signal with a frequency that is twice as high as the clock frequency of the reference clock by transforming a level of the sound signal to a pulse width during periods in which the reference clock is at a high level and a low level, and that amplifies the sound signal by switching a predetermined direct voltage based on the pulse-width modulated signal.

* * * * *